US00RE35550E

United States Patent [19]

Jongewaard et al.

[11] E Patent Number: Re. 35,550

[45] Reissued Date of Patent: Jul. 1, 1997

[54] THERMAL DYE TRANSFER MATERIALS

[75] Inventors: Susan K. Jongewaard, St. Paul; Terrance P. Smith, Woodbury; Krzysztof A. Zaklika, St. Paul, all of Minn.

[73] Assignee: Minnesota Mining and Manufacturing Company, St. Paul, Minn.

[21] Appl. No.: 746,112

[22] Filed: Aug. 15, 1991

Related U.S. Patent Documents

Reissue of:

[64] Patent No.: 4,857,503
Issued: Aug. 15, 1989
Appl. No.: 193,947
Filed: May 13, 1988

[51] Int. Cl.[6] ..... B52B 9/00

[52] U.S. Cl. ..... 503/227; 428/195; 428/913; 428/914; 8/471

[58] Field of Search ..... 8/471; 428/195, 428/913, 914; 503/227

[56] References Cited

U.S. PATENT DOCUMENTS

| | | | |
|---|---|---|---|
| 3,498,914 | 3/1970 | Lemkey | 252/1 |
| 4,614,682 | 9/1986 | Suzuki et al. | 428/213 |
| 4,690,858 | 9/1987 | Oka et al. | 428/216 |
| 4,720,480 | 1/1988 | Ito et al. | 503/227 |
| 4,820,686 | 4/1989 | Ito et al. | 503/227 |

FOREIGN PATENT DOCUMENTS

| | | | |
|---|---|---|---|
| 57-105395 | 6/1982 | Japan . | |
| 58-90984 | 5/1983 | Japan | 503/208 |
| 58-101095 | 6/1983 | Japan . | |
| 62-130877 | 6/1987 | Japan | 503/208 |
| 62-135388 | 6/1987 | Japan | 503/208 |
| 62-173283 | 7/1987 | Japan | 503/208 |

OTHER PUBLICATIONS

"The Adsorption of Disperse Dyes in Admixture", A. Johnson et al., J. Soc. Dye Chem., vol. 80, Mar. 1964, pp. 129–134.

J. Imaging Tech., vol. 11, No. 3, Jun. 1985, "UV–Fixable Thermal Recording Paper", H. Sato et al., pp. 137–141.

J. Imaging Tech. vol. 10, No. 2, Apr. 1984, "UV–Fixable Diazotype Thermal Recording Paper", pp. 74–79.

"Mechanisms of Color Formation on Thermo–Sensitive Paper", A. Igarashi et al., 1981, pp. 886–916.

*Primary Examiner*—Patrick J. Ryan
*Assistant Examiner*—Elizabeth Evans
*Attorney, Agent, or Firm*—Gary L. Griswold; Walter N. Kirn; Mark A. Litman

[57] ABSTRACT

The use of eutectic combinations of a dye and a second compound (which may also be a dye) in a binder has been found to provide benefits to thermal dye transfer materials.

31 Claims, 9 Drawing Sheets

THERMAL DYE TRANSFER MATERIALS

Matter enclosed in heavy brackets [ ] appears in the original patent but forms no part of this reissue specification; matter printed in italics indicates the additions made by reissue.

BACKGROUND OF THE INVENTION

1. Field of the Invention

This invention relates to thermal dye transfer printing, and more particularly to dyes used in a thermal dye transfer printing construction. The dyes comprise a specific type of mixture known as a eutectic mixture. The eutectic mixture has at least two components.

2. Background of the Art

Various dyes are used in thermal transfer systems. Dyes are used in both thermal mass transfer systems, and thermal dye transfer systems. Dye groups described in the prior art are generally characterized as relatively sublimable disperse dyes or solvent dyes. Dyes are generally used singly or as a combination for a monochrome color. Some patents list dyes used in combination, but relatively little information is given to the composition and properties of the dye mixtures.

Dyes are usually described as being dissolved in a solvent with the binder resin and coated onto a substrate to form an ink layer on the substrate. The dye is often described as subliming under the action of the heat energy of the thermal head, and transferring to an image receptive sheet.

Dyes are also described as being suspended within the binder in the form of particles. To facilitate sublimation, the dyes usually have a low molecular weight of about 100 to 750. Criteria for selection of dyes include sublimation temperature, hue, weatherability, solubility of the dye in ink compositions or binder resins, and other factors. The dye is usually present in an amount which is dependent upon the degree of its transfer at the sublimation temperature, and the covering power in the transferred state.

The broad technical area of imaging art contains a number of disclosures of dye- or dye former-containing eutectics, many of them used in certain imaging procedures. Frequently, mention is made in the literature of eutectic compounds or eutectic complexes. There are no such materials as eutectic compounds or complexes in the true technical sense normally understood by a chemist. Eutectics are definitely mixtures, not compounds, of two or more chemically distinct entities. Furthermore, a solid eutectic contains separate crystals of each of the mixed entities, not a mixture at the molecular level.

U.S. Pat. No. 4,614,682, entitled "Thermosensitive Image Transfer Recording Medium" discusses a thermosensitive recording medium comprising a support material and a thermofusible ink layer formed thereon, which thermofusible ink layer comprises a dye component, a binder agent, and a pigment having needle-like crystal form, which is dispersed in a network form throughout the thermofusible ink layer. Dye components are specifically described as, "it is preferable that the eutectic temperatures of the dyes to be used with a binder agent be in the range of 50° C. to 140° C., although the eutectic temperatures vary depending upon the binder agent to be used in combinations." Claim 7 details "A thermosensitive image transfer recording medium as claimed in claim 1, wherein the eutectic temperature of said dye component in combination of said binder agent is in the range of 50° C. to 140° C." It appears this refers to a eutectic combination of a dye and a binder.

The same mentioned patent refers to the dye as being of a smaller particle size than the needle-like pigments to be used, and that the dye be in a dissolved state.

Japanese patent publication JP 60-056590 assigned to Mitsubishi Electric Corp. describes a reusable heatsensitive recording sheet which includes a layer containing: (a1) dye; (a2) material lowering the melting point of (a1l); (a3) material dissolving (a1) and (a2) at elevated temperature;, (a4) a surfactant with melting point of 40° to 100° C. Preferably the mixture of (a1) and (a2) is what is described as eutectic or cocrystalline material. The mixed ratio of (a1) and (a2) is 1:10 and 10:1 Dye (a1) is preferably an anthraquinone or azo disperse dye. Compound (a2) is, e.g. p-nitrobenzaldehyde, stearamide, methyl-4-tert-butylphenol, etc. Material (a3) is, e.g. glycerin, diethylene glycol, triethylene glycol, etc. Surfactant (a4) is, e.g., an ester of a long chain fatty acid. The mixture (a1)–(a4) is contained in a polymeric binder. The advantages of this invention are good sensitivity, good gradation properties, and reuse.

Matsushita Electric Corp. Japanese patent abstract JP 59-93389 speaks of a color sheet material for thermal transfer with particles containing at least two kinds of coloring material. The particles contain at least one of a basic subliming dye and a disperse subliming dye. Mention is made of microencapsulation of the dye, but it is not clear whether this refers to the combination or to the individual dyes. No reference to eutectics appears in the abstract.

Many Ricoh patent publications (e.g. JP 62-135388, JP 62-130877, JP 58-211493, JP 57-201693, JP 57-014094, JP 58-211493) speak of eutectics or eutectic compounds in connection with thermal leuco dye imaging systems. Work at Fuji (A. Igarashi and T. Ikeda, Proc. 1st International Congress on Advances in Non-Impact Printing Technologies, 1982, p. 886) definitely shows occurrence of true eutectics in some constructions. However, in contrast to the purely physical process of thermal transfer in our invention, the melting of the eutectic in these systems is used to trigger a chemical reaction which results in color formation from the colorless leuco dye.

A similar situation arises in connection with thermal diazo imaging systems. Work at NTT (H. Sato, K. Sukegawa and Y. Ooba, J. Imaging. Technol., 10, 74 (1984); H. Sato, Y. Ooba and S. Sugawara, ibid., 11, 137 (1985)) has established the importance of both binary and ternary eutectics in these systems, but again this is a chemistry-triggering situation.

Several patents concern mixtures of dyes selected for hue adjustment. The abstracts make no mention of eutectics. Mitsubishi Chemical Industries (JP 61-148096) claims a sublimation transfer recording material giving pure black images from a mixture of matched yellow, cyan and magenta dyes. U.S. Pat. No. 4,401,692 assigned to Hoechst concerns a transfer print carrier for printing on polymers having a mixture of blue and red to yellow, readily sublimable, disperse dyes giving fast black dyeings. Bayer (DE 3537257) claims a mixture of specific azo and anthraquinone dyes for selectivity dyeing polyester in polyester-cotton blends by the thermosol or HT steam process. The azo is present at 90 to 99.5 wt %.

Eutectic mixtures of dyes have been investigated in connection with the non-additivity of dye adsorption isotherms for the dyeing of fibers with dye mixtures (A. Johnson, R. H. Peters and A. S. Ramadan, J. Soc. Dyers Colour., 80, 129 (1964), but this appears to be quite unconnected with the present invention. Similarly, patents on eutectic dye carriers (e.g. U.S. Pat. No. 3,925,013 and U.S.

Pat. No. 3,787,181) where the dye is not part of the eutectic also appear to be of no real relevance.

Several Ricoh patents (e.g. JP 58-065441, JP 57-122040, JP 56-142536) claim electrophotographic elements with "eutectic crystal complexes" of a pyrilium dye, polymer and charge transport material, apparently analogous to Kodak work showing formation of a complex of thiapyrylium dye and polycarbonate (W. J. Dulmage et al. J. Appl. Phys., 49, 5543, (1978). Similarly Japanese patent publication JP 60-044553 (examined JP 87-04182) dicusses a photoconductor sensitizing dye disclosed as a eutectic of a merocyanine dye and an organic electron acceptor.

Eutectic mixtures of compounds are cited in the patent literature that discusses eutectic compounds related to liquid crystal compounds, pharmaceuticals, perfumeries, and dye carriers for textile printing.

Japanese patent publications listing the use of anthraquinone dyes in a thermal transfer composition are JP 61-227093, 61-035993, 60-151097, 60-253595, 60-131292, 60-131293, 60-131294, 60-172591, 60-031559, 60-053563, 59-227948, 60-217266, 59-091644, 59-000221.

Japanese patents listing the use of azo dyes in a thermal transfer construction are JP 51-112993, 61-227091, 61-227092, 61-224595, 61-119786, 61-144388, 58-111176.

SUMMARY OF THE INVENTION

This invention provides a thermal dye transfer composition comprising a eutectic mixture of at least two solid organic dyes contained in a polymeric binder. The dyes are preferably selected from the azo, anthraquinone, aminostyryl, azomethine, and disulphone classes. Sets of two or more of the dyes are selected, mixtures of which, at atmospheric pressure, exhibit at least one eutectic point at a temperature at least 5° C. and preferably at least 10° C. below the melting point of the lowest melting individual component.

Useful constructions are obtained when at least one molar ratio of the eutectic components taken a pair at a time is between 0.25 and 4.0 times their molar ratio at a eutectic point composition. The molar ratio of these two dyes in this mixture at their eutectic point composition should be between 0.05 and 20.0, and the eutectic point temperature for the combinations may be in the temperature range commonly used in the art for thermal transfer, e.g. 70° C. to 250° C. It is emphasized that the dye mixtures should form true eutectics as defined below.

A eutectic composition evidences particular physical properties. At a precise eutectic point composition, when the composition is heated to the melting temperature of the eutectic, the solid phase of the composition has the same molecular proportions of the components of the eutectic as does the generated liquid phase (the melt). The proportions of materials (either weight/weight, or mole/mole) being added to the liquid phase are the same as the proportions in the melt and in the solid phase. Where the ratio of materials which can form a eutectic differs from the ratio at the eutectic point composition, proportions of materials at approximately the eutectic point composition ratio first melt and then the residual solids melt. This is true no matter how many compounds make up the eutectic.

Where two (or more) compounds are capable of forming a eutectic, the lowest melting point for the combination of the compounds is a eutectic point for the compounds. At the eutectic point composition melting usually occurs over a narrow temperature range.

A eutectic mixture of at least two compounds has one or more eutectic points and is a thermodynamic entity with a precise and specific definition. Its existence is characterized by definite features displayed in a phase diagram. However, it is not uncommon to find references to eutectic mixtures in the patent and other literature where no evidence for conformance of the mixture to the thermodynamic criteria for a eutectic is presented. The term is used loosely in those situations to signify any mixture which exhibits a melting point depression compared to the pure components. Other types of non-eutectic mixtures (e.g. solid solutions) can show melting point depression, but they are not eutectics. We are concerned with mixtures which are eutectics; other mixtures are not within the scope of the patent.

We use anthraquinone, azo or other dyes in specifically eutectic combinations with each other or with a colorless material. Our definition of useful mixtures is based on the amount of melting point depression at the eutectic point, not necessarily on component ratios of the mixture. We also contain this mixture in a polymer binder. We do not specifically require the presence of a material dissolving both the dye and the second eutectic component. In fact, we believe that this might sometimes reduce the effectiveness of the invention.

In common with the rest of the art plasticizers, surfactants and other additives may be used in the donor and receptor constructions.

Thermal dye transfer media or elements may have a variety of different structures and may be used in a number of different processes. The medium may be a single self-sustaining layer of dyes in a binder. The percentage of dye in the total composition of such a single layer element would tend to be lower than the percentage of dye in a multilayer system. This is because the binder in such a single layer system must provide the totality of structural support for the layer and cannot do so at extremely low percentages. The binder in such a single layer system may have to be at least 20% by weight of the layer and preferably is at least 40% by weight of a single layer transfer element. This single layer element would tend to provide lower optical densities than would multilayer sheets comprising the dye and binder coated on a carrier layer. The latter types of constructions use the binder to give the dye layer cohesive strength but do not have to provide self-sustaining independent integrity to a single layer. The percentage of binder in the donor layer of a supported thermal dye transfer element may therefore be used in a broader range than the binder in a single layer element. In some cases it may be possible to use as little as one or two percent binder or even less (99% or 98% by weight dye) in a supported layer. However a more typical range could be about 90% dye to 20% by weight dye. The preferred range for multilayer constructions is 70–40% by weight, and most preferred is 60–50% by weight dye to binder in the donor layer on the carrier sheet.

The carrier sheet is preferably flexible, but may be rigid if the receptor layer is sufficiently flexible and/or conformable. The carrier layer may thus be glass, ceramic, metal, metal oxide, fibrous materials, paper, polymers, resins, coated paper or mixtures or layers of these materials. The carriers may be opaque, translucent or transparent and may be extremely thin if used with backside thermal print heads or may be thick if used with a front thermal exposure system. Such a front thermal exposure system could be a laser which would expose through a transparent receptor layer in contact with a donor layer having the eutectic dye mixture.

This invention has utility in thermal dye transfer imaging. Constructions containing eutectic mixtures of dyes are found to have improved properties when compared with constructions containing a single dye or a simple mixture of dyes. Several beneficial effects are found. These may include: improved image density, increased dye transfer efficiency, higher image transparency, enhanced grey scale, better donor sheet handling characteristics, longer donor sheet shelf life and greater thermal and light stability of the image. Examples of these are given below, though beneficial effects are not restricted to these examples.

It should be noted that in many cases it is particularly advantageous to use a eutectic mixture where both components are dyes of similar color, because then all material transferred to the image receptor contributes to image density of the required hue (e.g. compounds 3 and 32 of Example 4). In other cases adding a second dye to the first produces an undesirable hue change, and a colorless eutectic-promoting second component may be employed (e.g. compounds 3 and 49 of Example 4). A further option is the formation of a eutectic mixture of two dyes of quite different color to generate a hue not otherwise conveniently available (e.g. compounds 23 and 32 of Example 4).

The eutectic-forming mixtures of this invention may be prepared in a number of ways. A mixture of the components may be dissolved in a suitable solvent, optionally containing other additives, and a solid obtained by evaporation of the solvent, or by the addition of a precipitating agent. The components may be intimately ground together by hand or by mechanical means. The components may also be mixed, heated to the molten state, and the solid mixture obtained by cooling. It is also envisaged that the mixtures that are the object of this invention can be formed by sublimation of the components, or by extrusion of the components together with a suitable binder into a film or other form. Other methods may occur to those skilled in the art, and the method of preparation of the eutectic mixture is not to be construed as a limitation on the scope of the invention.

DETAILED DESCRIPTION OF THE INVENTION

Figure 1A:
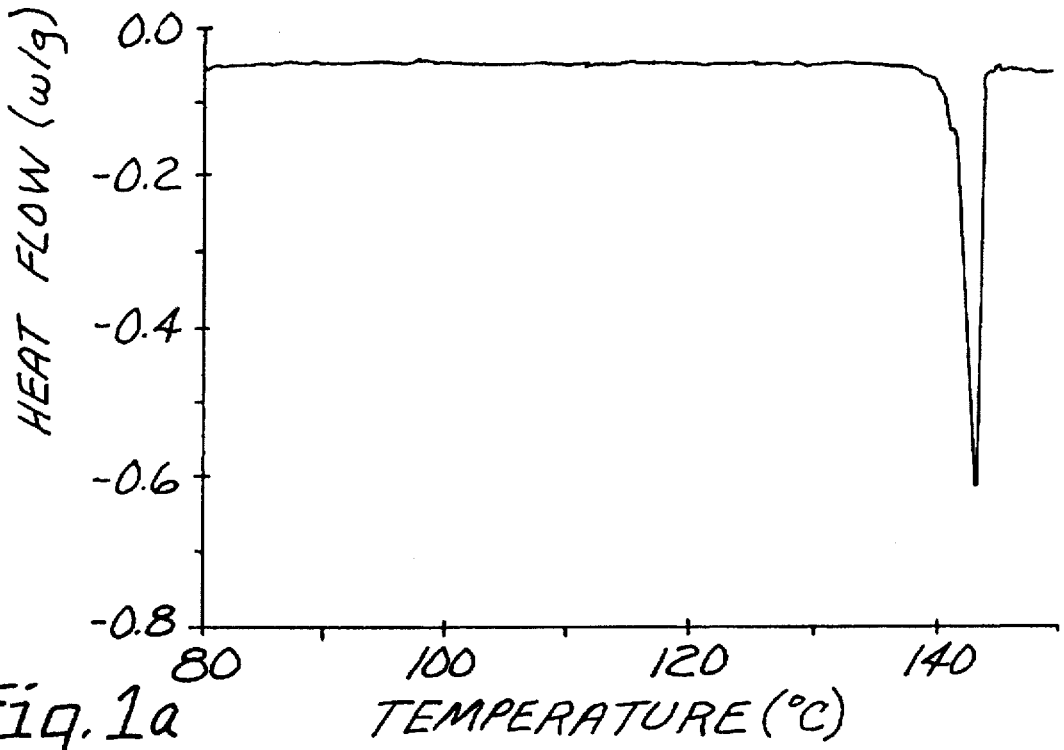
FIGS. 1(a)–1(e) show graphs of the Heat Flow versus Temperature for eutectic mixtures.
Figure 1B:
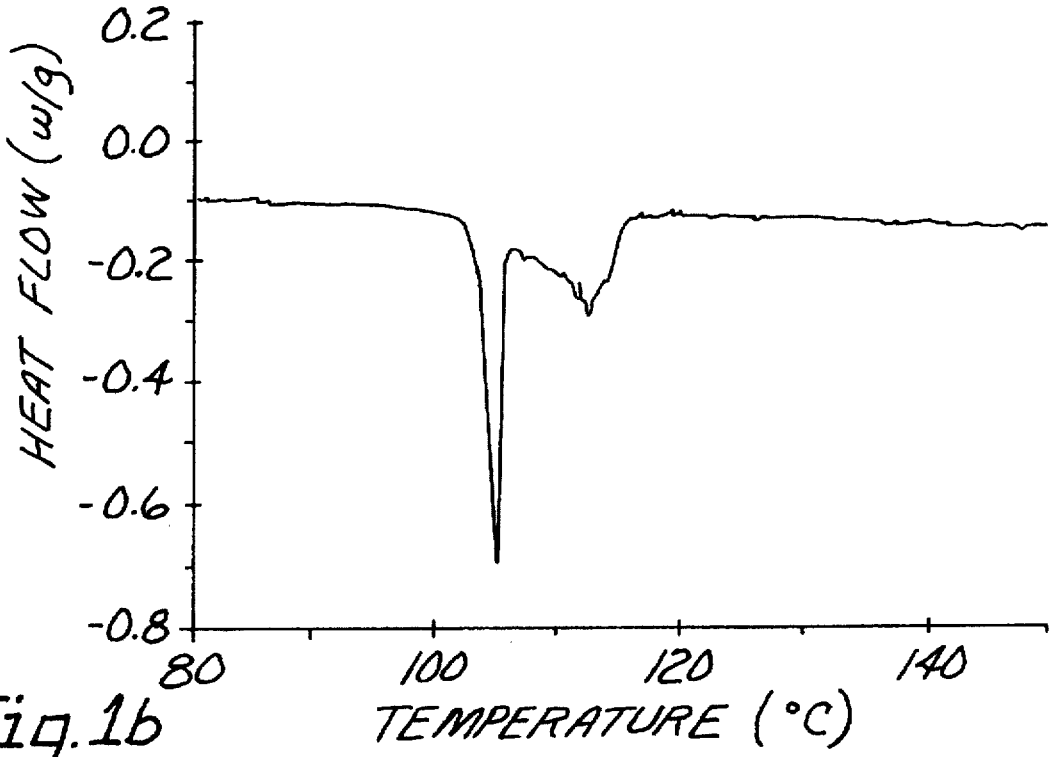
Figure 1C:
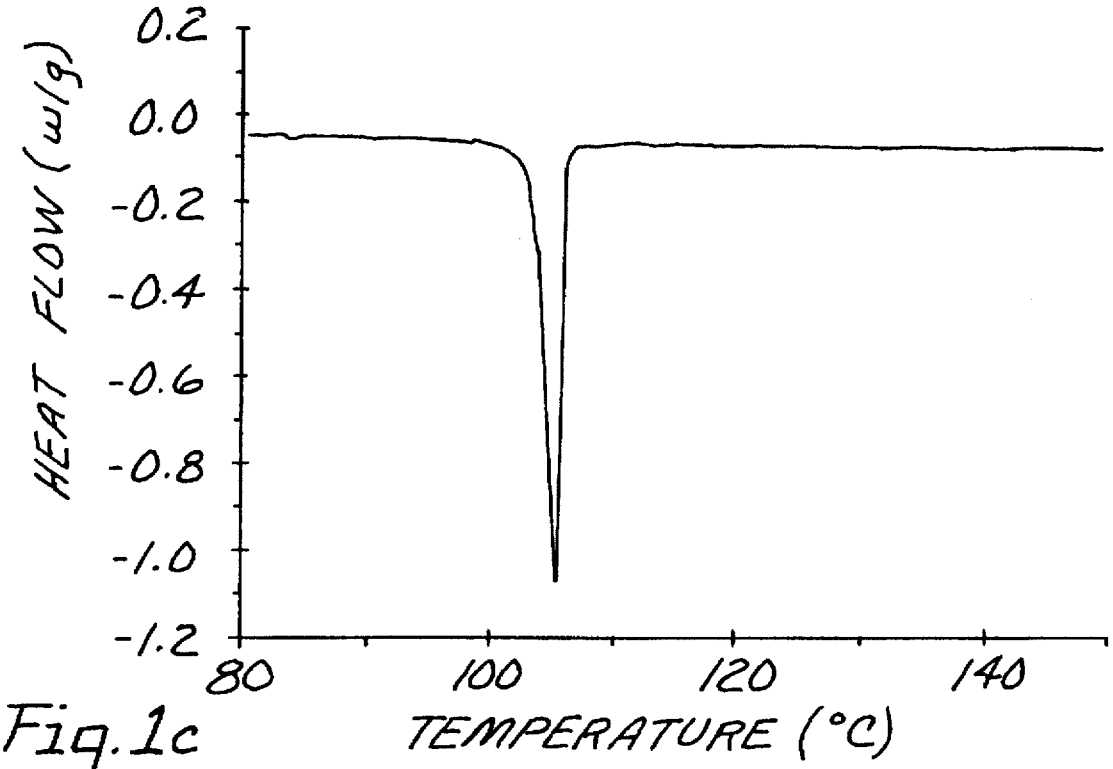
Figure 1D:
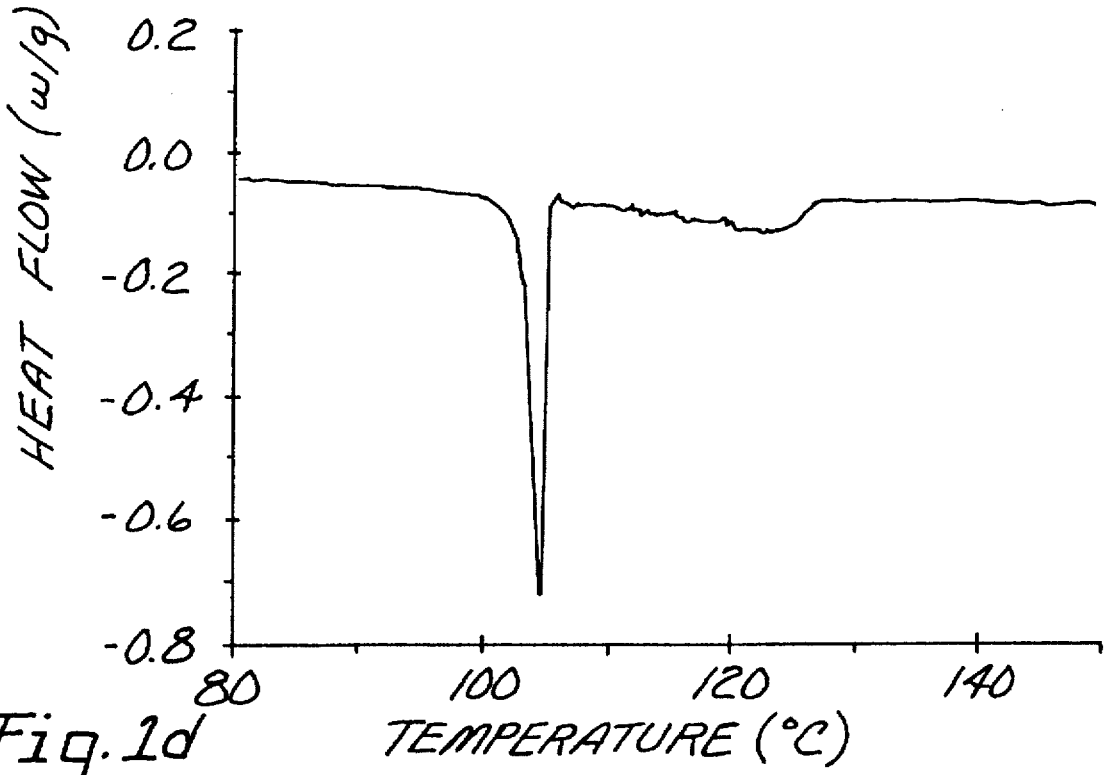
Figure 1E:
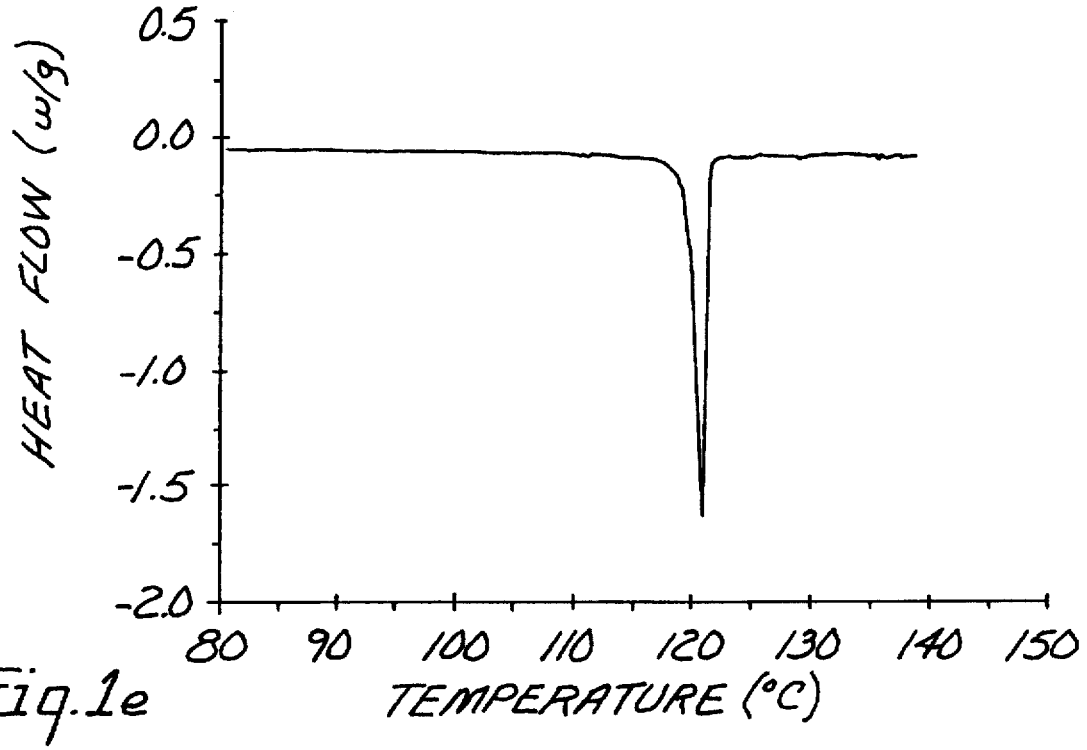

A univariant (i.e. pressure dependent) eutectic point occurs when two solid phases are in equilibrium with their liquid melt. At constant pressure the eutectic point becomes invariant, occurring at a unique temperature and composition. If a liquid of the composition of the eutectic point is cooled, a mixture of the solid components forms having the same composition as the liquid. There is no solid solution or chemical compound associated with the freezing of the mixture. In some cases the two components of the mixture can form solid compounds having congruent melting points at a dystectic point composition. Multiple eutectic points can then arise, which on freezing result in mixtures of fixed proportion of one of the original components and the new compound formed from the two components. Again there is no solid solution or new chemical compound associated with this eutectic point.

At fixed pressure, the eutectic point in a binary component system corresponds to the lowest melting mixture of the two components. However, the converse is not true; when solid solutions are able to form over the entire composition range of the mixture, the lowest melting composition is not a eutectic, but either a pure component or a solid solution. Other, more complex, equilibria can arise, but do not change this fundamental picture. These are described in standard texts, e.g. "The Phase Rule and its Applications", A. N. Campbell and N. A. Smith, Dover Publications, 1951, p. 133ff.

The invention consists of a thermal dye transfer composition containing a mixture of at least two solid dye components selected so that this mixture forms at least one eutectic point at atmospheric pressure. In the application of this invention, the solid components of the mixture, present in proportions at or near the eutectic composition, are deposited as a film usually in a polymeric binder, optionally containing other additives, to form a layer as part of a donor sheet preferably on a suitable substrate. Preferred binders are vinyl chlorides including chlorinated polyvinyl chloride, polyvinyl chloride, cellulose derivatives, and vinyl butyrals. The donor sheet is contact with an appropriate receptor sheet and heat is applied in an imagewise fashion. Under the influence of heating the eutectic dye mixture, but substantially none of the binder, is transferred to the receptor sheet to form a colored image. Eutectic mixtures of one dye with a colorless compound have also shown some advantages, but there may be a loss in color quantity for a given addition of dye. The formation of solid solutions or chemical compounds between the components of the subject mixture is not excluded provided a eutectic point also occurs. Because of this, and the looseness with which the term eutectic is often applied, the identification and characterization of the eutectic mixture is of prime importance to this invention.

Whether a mixture of components exhibits a eutectic point can be established most usefully by differential scanning calorimetry, and confirmed by other techniques such as optical microscopy or X-ray diffraction. Differential scanning calorimetry of a eutectic-forming mixture of two components at the composition of the eutectic point exhibits a single, sharp melting endothermic peak. At compositions of the mixture different from the eutectic point two endothermic peaks are seen. One is sharp, and occurs at the temperature of the eutectic point. The other peak corresponds to melting of whichever component is in excess relative to the eutectic composition, and is typically broader and found at lower temperatures than that for this component in isolation. The eutectic point appears as a cusp (i.e., a sharp discontinuity formed by the meeting of two curves) in contact with a eutectic horizontal in the phase diagram, which represents equilibria in the mixture as a function of temperature and composition at constant pressure. Solid solutions may also exhibit a single sharp melting endotherm at some composition corresponding to the lowest melting point of the mixture, but in contradistinction to eutectic-forming mixtures, the behavior of these as the proportion of the components is changed is different. A single melting endotherm is seen, whose temperature is dependent on composition, and which is typically broadened compared to that at the lowest melting point. The phase diagram no longer exhibits a eutectic horizontal. An instance of the eutectic behavior that is the subject of this invention is provided in Examples 1 and 2. Other representative phase diagrams are given in Example 3.

Anthraquinone dyes found useful in the practice of this invention include anthraquinone dyes substituted once or severally with one or more of the following functional groups: amino, alkylamino, arylamino, acylamino, aroylamino, aroylamino wherein the aryl ring is further substituted, alkylsulfonylamino, alkylsulfonylamino wherein the alkyl chain may be branched and contains from two to twenty carbons atoms, arylsulfonylamino, arylsulfonylamino wherein the aryl ring is further substituted, hydroxy, alkoxy, aryloxy, substituted aryloxy, alkylthio, arylthio, substituted arylthio, chloro, bromo etc.

Azo dyes found useful for this invention include dyes consisting of an azo group substituted with a group A at one end and a group B at the other. Group A consists of an aryl group containing one or more of the following substitutents: hydrogen, amino, alkylamino, arylamino, substituted alkylamino, substituted arylamino, alicyclic amino; or group A consists of a pryidone, a substituted pyridone, a cyano-substituted pyridone, a hydroxy-substituted pyridone, an alkyl-substituted pyridone. Group B consists of an aryl group containing one or more of the following substituents: hydrogen, hydroxy, alkoxy, aryloxy, substituted aryloxy, alkyl, substituted alkyl, haloalkyl, aryl, substituted aryl, amino, alkylamino, arylamino, substituted arylamino, alicyclic amino, chloro, bromo, thioalkyl, thioaryl, substituted thioaryl, cyano, nitro, acylamino, substituted acylamino, aroylamino; or group B is: a heterocycle, a substituted heterocycle, a furan, a substituted furan, a thiofuran, a substituted thiofuran, a thiazole, a substituted thiazole, a benzothiazole, a substituted benzothiazole, a diazole, a substituted diazole, a benzodiazole, a substituted benzodiazole.

The term "dye" as used in the practice of the present invention refers to a compound which absorbs at least some radiation in the visible region of the electromagnetic spectrum with a molar extinction coefficient in a suitable solvent rising at least to 500, and therefore exhibits a color. The material must be soluble in water or an organic solvent but does not have to be completely dissolved in the donor layer. In fact, because of the high percentage of dye used, at least some is present as solid dye (which is often referred to as pigment). Some of the dye is present as small crystals of the dye. The two or more dyes which form the eutectic are in an intimate physical association within the donor layer of the thermal transfer element so that eutectic behavior can be exhibited in the donor layer. The dyes are in part usually present as distinct crystals of individual dyes, but some dye may be present dissolved in the binder or in a solid solution with other dye(s). Generally at least some of each dye is present as distinct small particulates (usually crystals) of the individual dyes.

EXAMPLE 1

Mixtures of various molar ratios of compounds 3 and 32 were prepared by grinding the components with a pestle and mortar. 5 mg of such a mixture was placed in an aluminum boat and heated at 1° C./min in a differential scanning calorimeter. Heat flow as a function of temperature was recorded from ambient temperature to 180° C. FIG. 1 presents the results, the eutectic composition occurring at a molar ratio of dye 3/dye 32 of 0.587.

| Figure number | Molar ratio dye 3/dye 32 | Temperature in °C. of first peak | Temperature in °C. of second peak |
|---|---|---|---|
| 1a | pure 3 | 143.3 | none |
| 1b | 0.205 | 105.2 | 112 |
| 1c | 0.587 | 105.4 | none |
| 1d | 2.030 | 104.6 | 123 |
| 1e | pure 32 | 120.9 | none |

EXAMPLE 2

Figure 2:
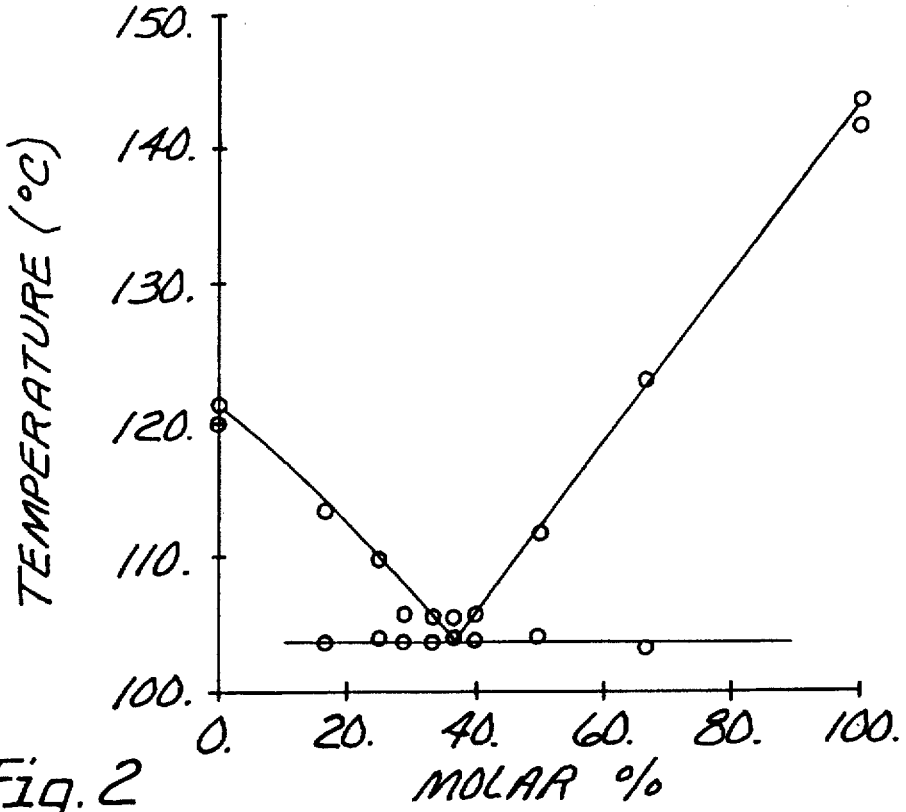
FIG. 2 shows a graph of the Molar Percent of Ingredients versus Temperature for the eutectic mixture of Example 2.
Figure 3A:
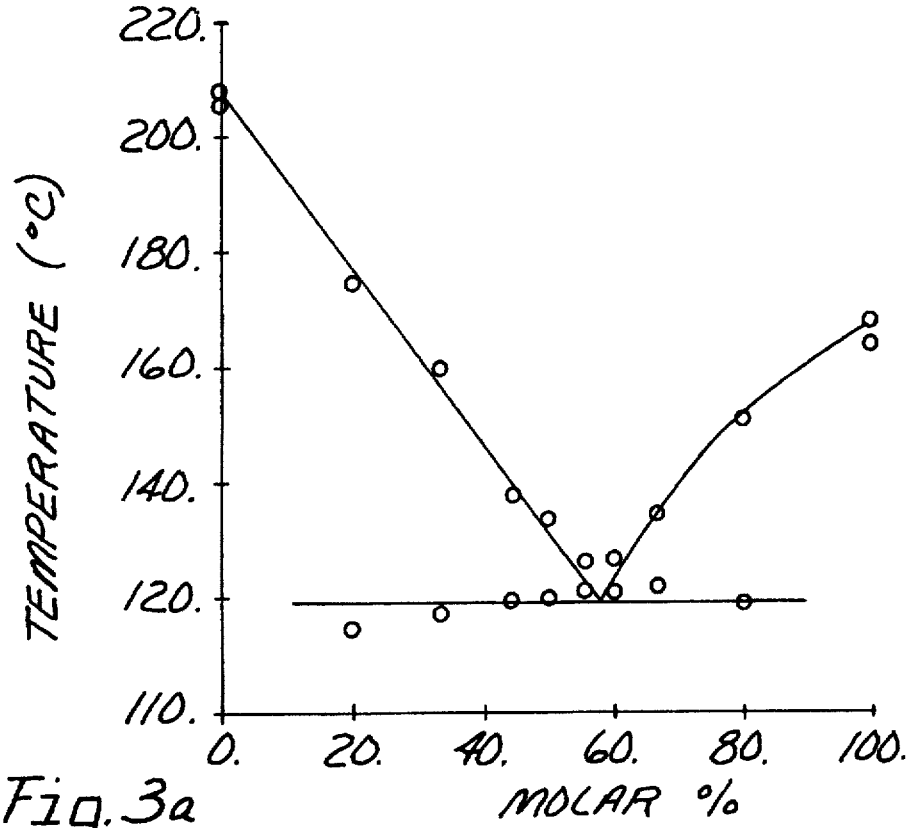
FIGS. 3(a)–3(d) show graphs of Molar Percent of Ingredients versus Temperature for the eutectic mixtures of Example 3.
Figure 3B:
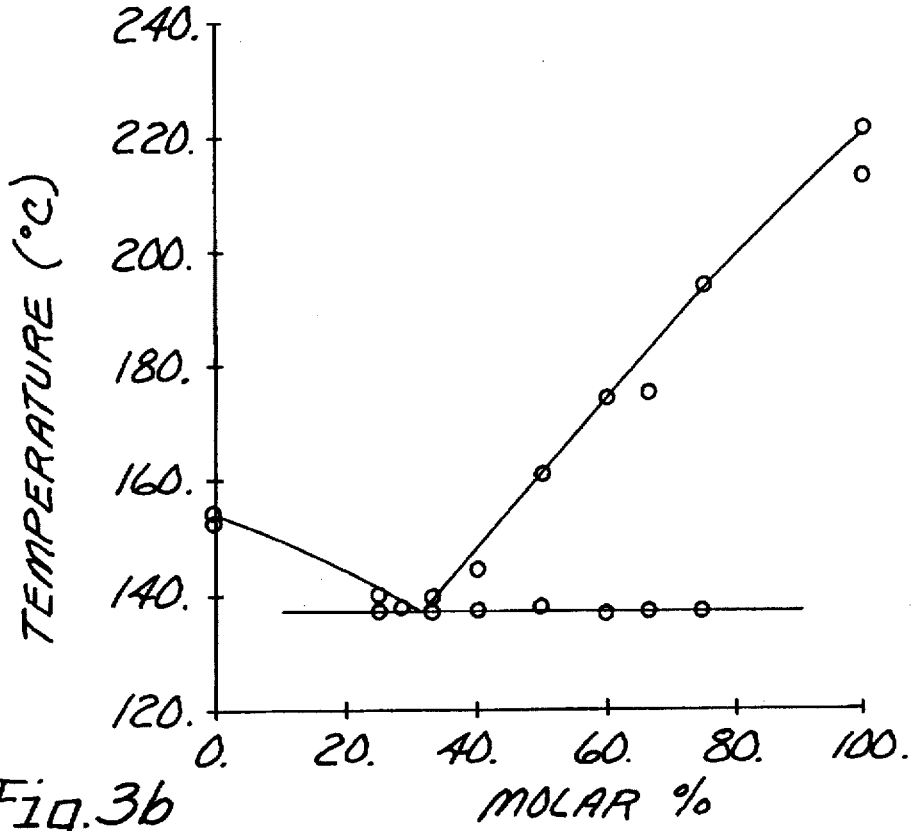
Figure 3C:
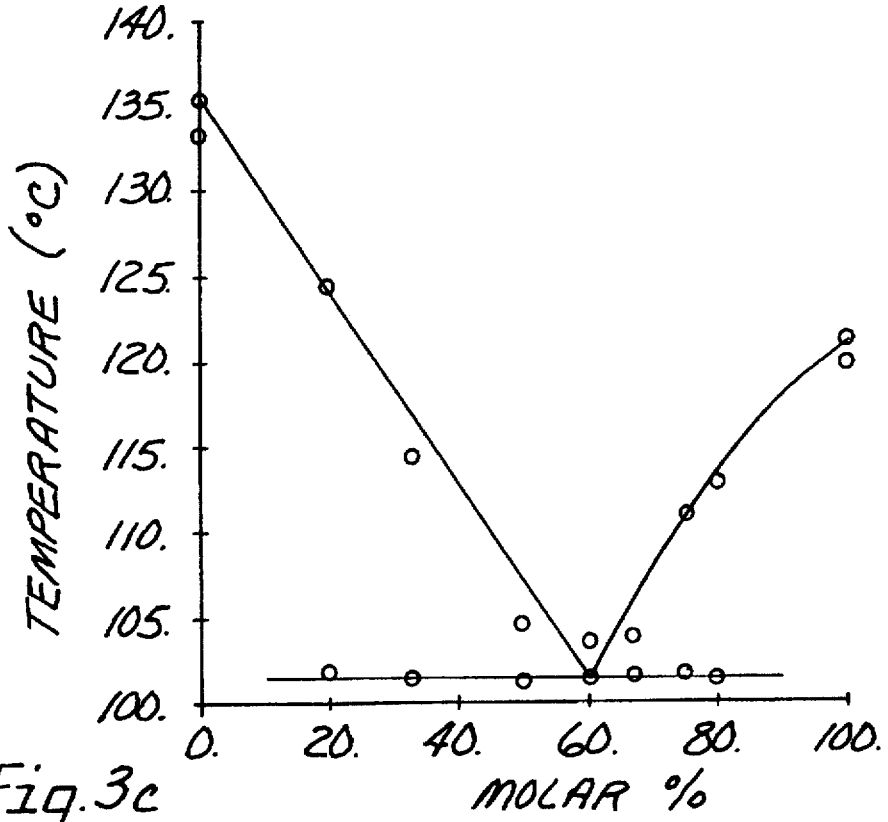
Figure 3D:
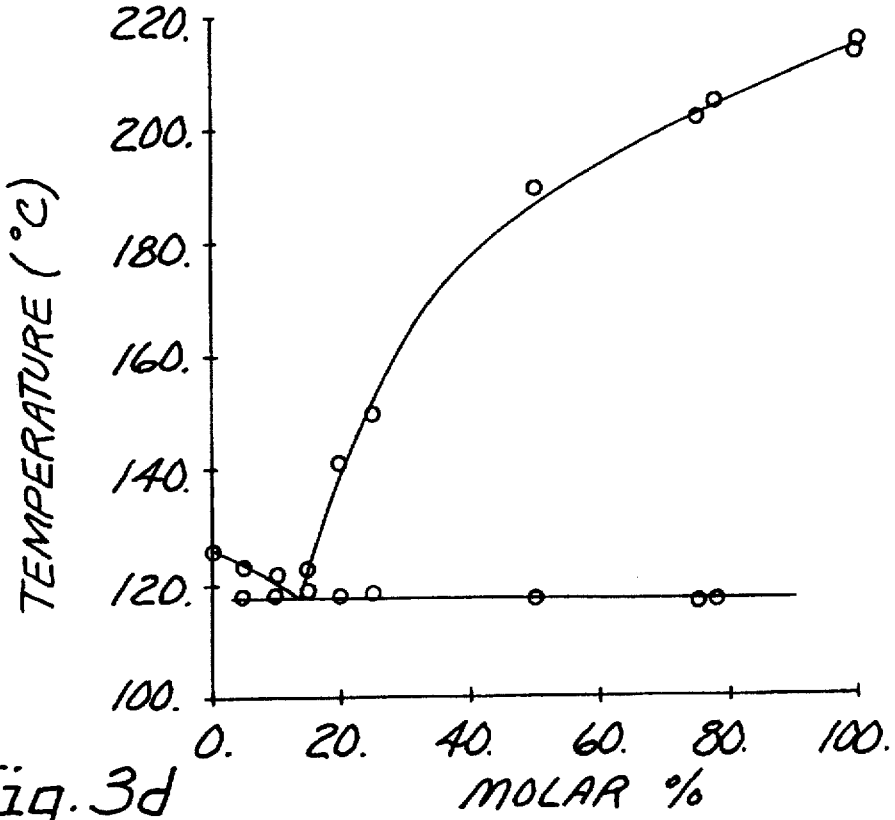

Mixtures of compounds 3 and 32 were prepared and subjected to differential scanning calorimetry as in Example 1. Onset of melting was determined by the tangent method and completion of melting was taken as the temperature at which 90 percent of the heat had been absorbed. The results were used to construct the phase diagram in FIG. 2. The temperature and composition at the cusp define the eutectic point and correspond to those in Example 1.

EXAMPLE 3

Mixtures of compounds listed below were prepared as in Example 1 and phase diagrams were determined as in Example 2. The results appear in FIG. 3(a)–(d), and the eutectic compositions (expressed as mole ratio of the first compound to the second) are summmarized below.

| Figure number | Mixture of compounds | Eutectic composition as molar ratio |
|---|---|---|
| 3a | 3 and 38 | 1.273 |
| 3b | 18 and 35 | 0.429 |
| 3c | 8 and 32 | 0.613 |
| 3d | 7 and 32 | 0.111 |

EXAMPLE 4

In view of the characteristic thermal behavior of eutectic mixtures described earlier and demonstrated in Example 1, a useful screening method for binary eutectic mixtures is differential scanning calorimetry of mixtures of various compositions, with the occurrence of a sharp, composition invariant endotherm taken to imply a eutectic-forming binary mixture. (A second, composition dependent, endotherm also occurs unless the mixture fortuitously has exactly the eutectic point composition). A further consideration in regard to practical utility is the eutectic depression, used herein to mean the difference in temperature between the lower of the melting points of the two pure components of the mixture and the melting point of their eutectic composition. Example 4A lists combinations of compounds found to have eutectic depressions of at least 5° C., while Example 4B lists combinations where the eutectic depression is less than 5° C.

EXAMPLE 4A

Binary mixtures of the compounds tabulated below were evaluated for eutectic depression as defined in the text by the methods of Example 1, except for a 20° C. per minute heating rate.

| First component | Second component | Eutectic depression (°C.) |
|---|---|---|
| 3 | 32 | 16.5 |
| 3 | 30 | 19.5 |
| 3 | 31 | 22 |
| 3 | 49 | 18 |
| 3 | 47 | 10 |
| 3 | 37 | 21 |
| 3 | 27 | 12 |
| 3 | 26 | 20 |
| 3 | 33 | 29 |
| 3 | 38 | 21 |
| 46 | 32 | 9 |
| 48 | 32 | 7 |
| 10 | 32 | 17 |
| 14 | 30 | 30 |

-continued

| First component | Second component | Eutectic depression (°C.) |
|---|---|---|
| 14 | 27 | 7 |
| 14 | 25 | 10 |
| 14 | 33 | 13 |
| 18 | 32 | 7 |
| 18 | 47 | 10 |
| 18 | 37 | 19 |
| 18 | 35 | 14 |
| 44 | 32 | 29 |
| 44 | 26 | 36 |
| 44 | 34 | 17 |
| 23 | 32 | 10 |
| 23 | 47 | 9 |
| 1 | 47 | 8 |
| 16 | 47 | 9 |
| 4 | 30 | 16 |
| 4 | 31 | 18 |
| 4 | 27 | 16 |
| 4 | 26 | 24 |
| 4 | 25 | 32 |
| 45 | 32 | 27 |
| 45 | 26 | 52 |
| 45 | 33 | 22 |
| 7 | 47 | 7 |
| 7 | 33 | 7 |
| 9 | 26 | 7 |
| 9 | 33 | 7 |
| 6 | 47 | 9 |
| 2 | 47 | 7 |
| 24 | 33 | 9 |
| 22 | 32 | 11 |
| 22 | 47 | 10 |
| 20 | 32 | 20 |
| 20 | 47 | 25 |
| 19 | 47 | 13 |
| 21 | 32 | 8 |
| 21 | 47 | 7 |
| 13 | 32 | 9 |
| 8 | 32 | 19 |
| 17 | 32 | 15 |
| 17 | 47 | 10 |
| 29 | 36 | 19 |
| 29 | 27 | 22 |
| 4 | 41 | 25 |
| 18 | 42 | 22 |
| 3 | 39 | 17 |
| 32 | 40 | 27 |
| 3 | 43 | 19 |
| 32 | 43 | 20 |

EXAMPLE 4B

Binary mixtures of the compounds tabulated below were evaluated for eutectic depression, as defined in the text, by the methods of Example 4A.

| First component | Second component | Eutectic depression (°C.) |
|---|---|---|
| 44 | 36 | 1 |
| 11 | 32 | 2 |
| 12 | 32 | 2 |
| 45 | 34 | 2 |
| 15 | 32 | 3 |
| 7 | 32 | 3 |

EXAMPLE 5

While binary eutectics are most readily studied, it should be understood that this invention extends to higher eutectics, such as ternary systems, for example. A ternary eutectic may comprise a mixture of three different compounds, but it is envisaged that there may also be other possibilities, for instance a mixture of two compounds, one of which can exist in two distinct crystalline phases. A ternary eutectic is exemplified by a mixture of compounds 4, 33 and 41, which shows a eutectic depression of 36° C. All three possible pairs of these three compounds also form eutectics, viz. 4 and 33 (eutectic depression 28° C.) 33 and 41 (22° C.), and 4 and 41 (24° C.). The ternary eutectic shows a eutectic depression of 8° C. with respect to the lowest melting of the three binary eutectics.

EXAMPLE 6

Solid solutions or chemical compounds formed from organic component compounds differ from a eutectic composition of the same class of compounds in that the X-ray diffraction pattern of the eutectic is a sum or superposition of the diffraction patterns of the pure components, whereas that of the solid solution or compound is not. This Example illustrates this point.

Figure 4A:
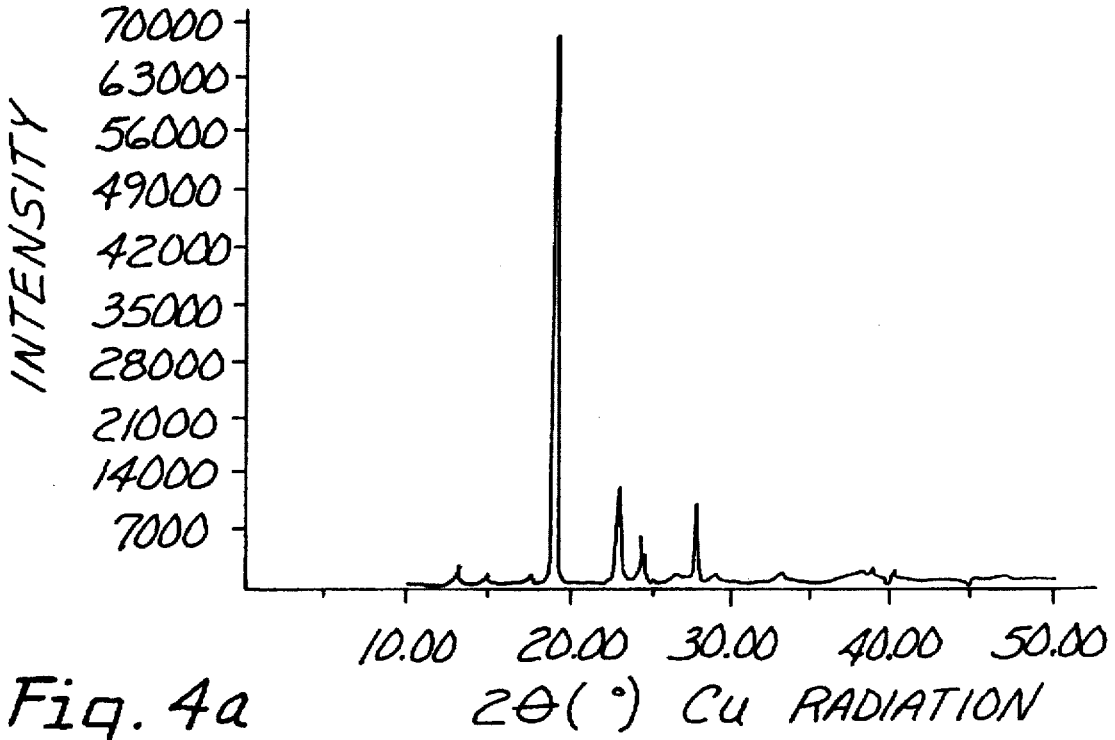
FIGS. 4(a) and 4(b) and 4(c) show graphs of eutectic mixtures using differential scanning calorimetry as shown in Example 4. The graphs are of X-ray powder diffraction patterns.
Figure 4B:
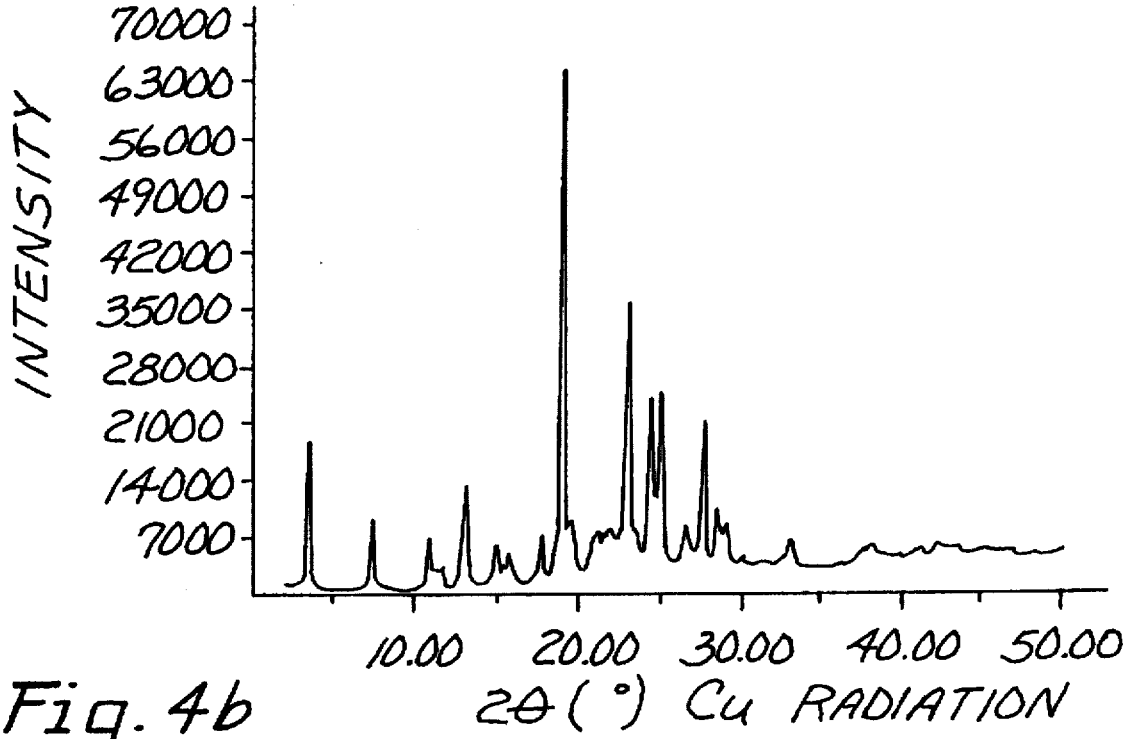
Figure 4C:
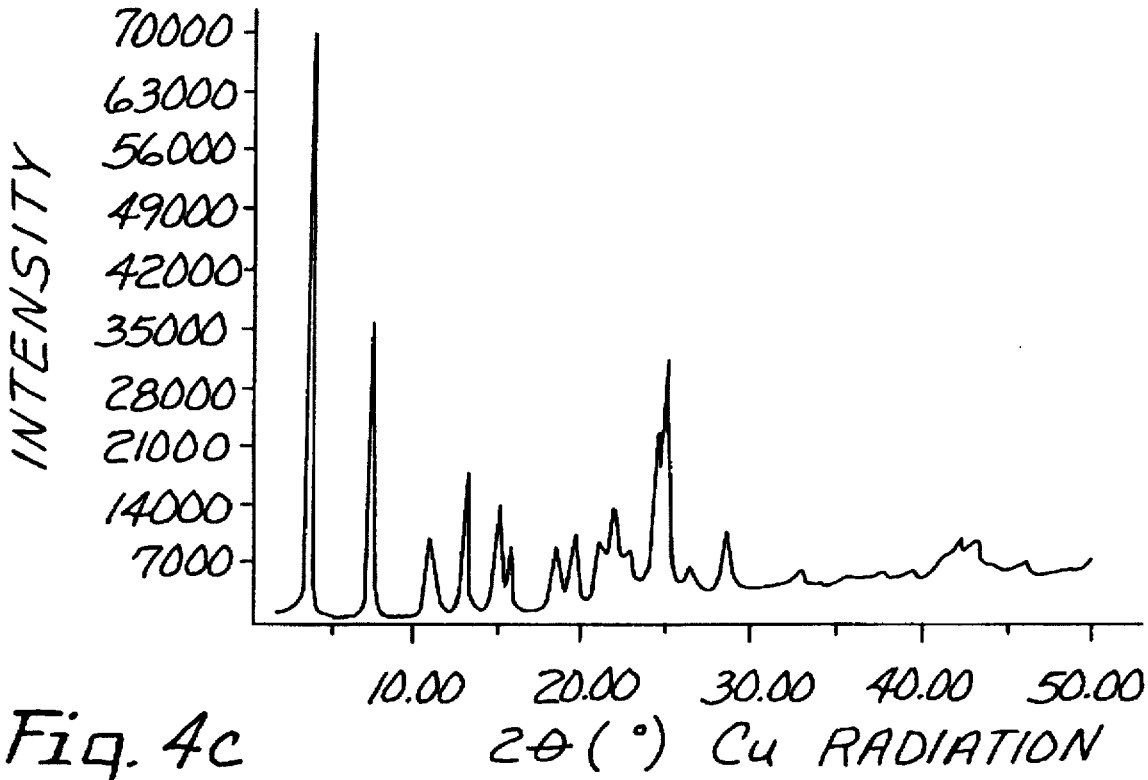

Compounds 3 and 32 are mixed in the ratio of the eutectic composition and ground with a pestle and mortar. After fusion and cooling to solidification, the mixture was ground again. This sample, together with samples of pure 3 and 32 which had been ground without melting, was used to obtain the X-ray powder diffraction patterns in FIG. 4. The Figures correspond to the following compositions:

| Figure number | Sample number | Composition |
|---|---|---|
| 4a | 6C | Pure 32 |
| 4b | 6A | Eutectic composition of 3 and 32 |
| 4c | 6B | Pure 3 |

The eutectic can be seen to contain separate crystals of both 3 and 32.

EXAMPLE 7

The eutectics of this invention, as characterized by the methods of Examples 1 to 6 are preferably contained in a polymeric binder. While the properties of a eutectic mixture may be modified by incorporation into a binder, perhaps to form a higher eutectic, the major and practically useful depression of the melting point is related to the original eutectic mixture.

A binary eutectic dye composition 7A of compounds 3 and 32 was prepared at the eutectic point molar ratio of dye 3/dye 32 of 0.587 as in Example 1. A second sample of this eutectic composition at the same molar ratio in a polymeric binder (7B) was prepared by incorporating 0.025 g of compound 3 and 0.035 g of compound 32 in the formulation of donor sheet A in Example 9. The solution was coated onto a glass plate with a number 8 wire-wound coating rod and allowed to air dry thoroughly to give a film which was then removed from the glass. Both samples were analyzed by differential scanning calorimetry as in Example 1 at a heating rate of 10° C./min. The eutectic depression for 7A was 16.5° C. The additional melting point depression on incorporating the binary mixture 7A into a binder (sample 7B) was 7° C., demonstrating the dominant effect of the binary eutectic dye mixture.

EXAMPLE 8

While eutectic-forming mixtures at a composition corresponding to the eutectic point are frequency required to provide the greatest benefit to the thermal dye transfer imaging process, this is not always the case, and embodiments of the invention utilizing compositions different from the eutectic point can be effective. The results show that, at a molar ratio differing by a factor of 0.43 from that at the eutectic point composition, the thermal properties of the mixture as a whole substantially reproduce the properties observed at the eutectic point itself.

Two mixtures of compounds 3 and 32 were prepared, one at a molar ratio of dye 3/dye 31 of 0.333 and the other at the eutectic composition (0.587), and were analyzed as in Example 1. Additionally the heat required for melting was obtained by integration of the endotherms. Separate experiments showed that the eutectic composition and compound 32 had essentially identical heats of fusion, so that the fraction of each mixture melting at the eutectic composition could be derived from the integration of the melting peaks, with the results below.

| Molar Ratio dye 3/dye 32 | Fraction of mixture melting at the eutectic composition |
|---|---|
| 0.587 | 100% |
| 0.333 | 75% |

EXAMPLE 9

General information pertaining to evaluation of the eutectic mixtures of this invention for thermal dye transfer imaging is recorded in this Example.

The following is a description of the various coating formulations referred to in the Examples of this patent, together with the thermal imaging equipment used to make images by thermal transfer of dye from donor to receptor sheets. All donor sheets were coated with a number 8 wire-wound coating rod (0.72 rail wet thickness) onto 5.7 micron Teijin F24G thermal film, which is representative of a thin polyester film, and dried in a current of air at ambient temperature unless noted otherwise. All receptor sheets were coated with a number 8 wire-wound coating rod onto 4 mil polyethylene terephthalate film and dried in a current of heated air.

Donor sheet A

The donor sheet formulation contained an amount of dye or eutectic mixture appropriate to the Example together with the following components:

0.04 g
Goodrich Temprite® 678×512 62.5% chlorinated polyvinyl chloride (CPVC)
0.007 g
60/40 blend of octadecyl acrylate and acrylic acid
0.0025 g
Goodyear Vitel® PE 200 polyester
2.00 g
tetrahydrofuran
0.90 g
methyl ethyl ketone

Donor sheet B

The donor sheet formulation contained an amount of dye or eutectic mixture appropriate to the Example together with the following components:

0.04 g
Goodrich Temprite® 678×512 62.5% CPVC
0.001 g
Emery Plastolein® 9776 polyester
2.26 g
tetrahydrofuran

Donor sheet C

The donor sheet formulation contained an amount of dye or eutectic mixture appropriate to the Example together with the following components:

0.04 g
Eastman Kodak CAB 553-0.4 cellulose acetate butyrate (CAB)
0.015 g
Emery Plastolein® 9776 polyester
0.001 g
3M Fluorad® FC 430 fluorocarbon surfactant
1.94 g
tetrahydrofuran
0.90 g
methyl ethyl ketone

Donor sheet D

The donor sheet formulation contained an amount of dye or eutectic mixture appropriate to the Example together with the following components:

0.025 g
Goodrich Temprite® 663×612 70% CPVC
0.01 g
60/40 blend of octadeeyl acrylate and acrylic add
0.01 g
Goodyear Vitel® PE 200 polyester
1.91 g
tetrahydrofuran
0.28 g
methyl ethyl ketone

Donor sheet E

The donor sheet formulation contained an amount of dye or eutectic mixture appropriate to the Example together with the following components:

0.03 g
Goodrich Temprite® 663×612 70% CPVC
0.01 g
60/40 blend of octadecyl acrylate and acrylic acid
0.005 g
Goodyear Vitel® PE 200 polyester
2.81 g
tetrahydrofuran (sheet E1) or
3.71 g
tetrahydrofuran (sheet E2)

Donor sheet F

The donor sheet formulation contained an amount of dye or eutectic mixture appropriate to the Example together with the following components:

0.04 g
Eastman Kodak CAB 553-0.4 CAB
0.0015 g
Emery Plastolein® 9776 polyester
0.001 g
3M Fluorad® FC 430 fluorocarbon surfactant
2.70 g
tetrahydrofuran
0.15 g
methyl ethyl ketone Receptor sheet A The receptor sheet was made from the following formulation:

0.04 g
Shell Epon ® 1002 epoxy resin
0.04 g
Goodyear Vitel® PE 200 polyester
0.05 g
3M Fluorad ® FC 430 fluorocarbon surfactant
0.015 g
Ciba-Geigy Tinuvin® 328 UV stabilizer
0.04 g
BASF Uvinul® N539 UV stabilizer
0.05 g
BASF Ferro® 1237 heat stabilizer
0.08 g
Eastman Kodak DOBP® 4-dodecyloxy-2-hydroxybenzophenone
0.20 g
Goodrich Temprite® 678×512 62.5% CPVC
0.25 g
ICI 382ES bisphenol A fumarate polyester
4.56 g
tetrahydrofuran
1.85 g
methyl ethyl ketone Receptor sheet B The receptor sheet was made from the following formulation:

0.25 g
ICI 382ES bisphenol A fumarate polyester
0.20 g
Goodrich Temprite® 678×512 62.5% CPVC
0.04 g
Shell Epon® 1002 epoxy resin
0.04 g
Goodyear Vitel® PE 200 polyester
0.02 g
Aldrich polyethylene glycol (MW 1000)
0.01 g
Cyanamid Cyasorb® 1084 UV stabilizer
0.01 g
BASF Uvinul® D49 UV stabilizer
0.05 g
BASF Uvinul® N537 UV stabilizer
4.56 g
tetrahydrofuran
1.46 g
methyl ethyl ketone Receptor sheet C The receptor sheet was made from the following formulation:

0.25 g
ICI 382ES bisphenol A fumarate polyester
0.20 g
Goodrich Temprite® 678×512 62.5% CPVC
0.04 g
Shell Epon® 1002 epoxy resin
0.04 g
Goodyear Vitel® PE 200 polyester
0.02 g
Aldrich polyethylene glycol (MW 1000)
0.05 g
3M Fluorad® FC 430 fluorocarbon surfactant
0.12 g
Ciba-Geigy Tinuvin® 292 UV stabilizer
0.01 g
Ciba-Geigy Tinuvin® 328 UV stabilizer
4.50 g
tetrahydrofuran
1.80 g
methyl ethyl ketone Printer A Thermal printer A used a Kyocera raised glaze thin film thermal print head with 8 dots/mm and 0.25 watts/dot. In normal imaging, the electrical energy varied from 2.64 to 6.43 joule/sq.cm, which corresponded to head voltages from 9 to 14 volts with a 4 msec pulse. Grey scale images were produced by using 32 of a maximum 64 electrical levels, produced by pulse width modulation.

Printer B

Thermal printer B used an OKI thin film, flat glazed thermal print head with 8 dots/ram and 0.27 watts/dot. In normal imaging, the electrical energy was 3 joule/sq.cm, administered with a 2.5 msec pulse. 32 electrical grey levels were available by pulse width modulation.

EXAMPLE 10

In many cases transparent thermal dye transfer images are required, for instance for projection applications, and maximum light transmission through such an image is desirable. A source of reduced light transmission is frequently scattering by particles or crystals of dye in the image. This Example illustrates both this undesirable effect, and its diminution in a eutectic mixture.

A thermal transfer donor sheet 10A comprising 0.03 g compound 3 and 0.03 g compound 32 in the donor sheet D composition of Example 9 was prepared. This is about 57% dye and 43% binder solids. A second donor sheet 10B was prepared identically except for omission of compound 3. Transferred dye images were formed on receptor sheet B and using printer B of Example 9.

Figure 5:
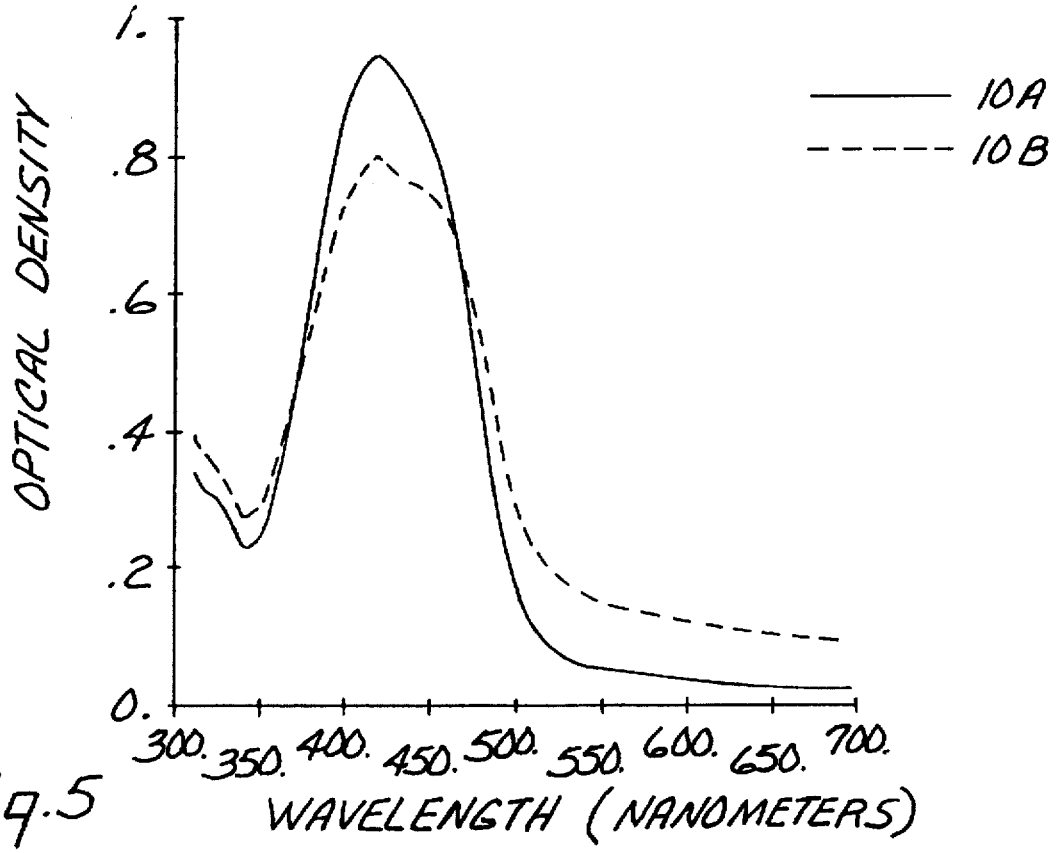
FIG. 5 is a graph of Optical Density venus Wavelength of Radiation.

FIG. 5 presents absorption spectra of the transferred images from both donors 10A and 10B on the receptor sheet at comparable peak density. The transferred image from donor 10A containing compounds 3 and 32 in a molar ratio 0.841 (compare with the eutectic molar ratio of 0.587) showed good density with negligible absorbance at 700 nm. In contrast the transferred image from donor 10B containing only compound 32 showed significant absorption at 700 nm, attributable to light scattering by large dye crystals in the image. This was confirmed by optical microscopy, which showed readily resolvable crystals in the transferred image from donor 10A but not from donor 10B.

EXAMPLE 11

It is desirable to minimize the thermal energy required to produce a maximal image density in a dye transfer process, both from the standpoint of achieving the most rapid imaging, and to prolong the life of the thermal printing element. One approach is to employ dyes with high tinctorial strength so that less dye mass need be transferred to produce a given image density. Azo dyes have high tinctorial strength, but can exhibit the undesirable scattering effect described for compound 32 in Example 10. Combination of the azo dye in a eutectic mixture with an anthraquinone dye permits the use of dyes of high tinctorial strength which would otherwise be unsuited to the application, and facilitates imaging to a higher density with a given thermal energy input. This Example illustrates the beneficial effects of a eutectic mixture of the azo dye 32 and the anthraquinone dye 8 of lower tinctorial strength on the simultaneous optimization of efficiency of dye transfer, peak density and light scattering.

Donor sheets 11A, 11B and 11C, containing respectively 0.06 g compound 8, 0.06 g compound 32, and 0.06 g of a mixture of 8 and 32 at the eutectic point composition (molar ratio of dye 8/dye 32 of 0.619) were made up using the formulation of donor sheet A in Example 9. Transferred dye images were made using receptor A and printer A of Example 9 with 12 volt, 4 msec pulses. An indicator of transfer efficiency of the dye (referred to herein as ITE) was computed as the ratio of the reflection optical density of the transferred image to the reflection optical density of the original donor sheet prior to imaging. The peak optical density corrected for scatter at 410 nm and the transmittance at 700 nm were determined from optical transmission spectra of the images on the receptor. The results are grouped in the table below.

| Donor sheet | Percent ITE | Peak optical density (410 nm) | Transmittance at 700 nm |
|---|---|---|---|
| 11A | 74 | 0.12 | 98 |
| 11B | 96 | 0.74 | 91 |
| 11C | 84 | 0.59 | 97 |

Sample 11C of the mixture of the eutectic composition had an acceptable apparent transfer efficiency and peak optical density, while maintaining low light scattering. Although sample 11B had a higher apparent transfer efficiency and peak optical density, the transmittance of 91% at 700 nm indicated that the sample exhibited excessive light scattering, rendering it unacceptable.

EXAMPLE 12

This Example shows the difference between use of single dyes, and a dye mixture at the eutectic point, on the efficiency of dye transfer to the receptor as a function of thermal imaging energy.

Donor sheets were prepared using 0.06 g of dye or dye mixture according to the formulation of donor sheet A in Example 9, with the components listed below. This is about 55% dye and 45% binder solid.

| Donor sheet no. | Dye or dye mixture | Molar ratio |
|---|---|---|
| 12-1A | 32 | no mixture |
| 12-1B | 8 and 32 | 0.250 |
| 12-1C | 8 and 32 | 0.619 - eutectic point |
| 12-1D | 8 and 32 | 4.033 |
| 12-2A | 38 | no mixture |
| 12-2B | 3 and 38 | 0.255 |
| 12-2C | 3 and 38 | 1.275 - eutectic point |
| 12-2D | 3 and 38 | 3.965 |

Figure 6:
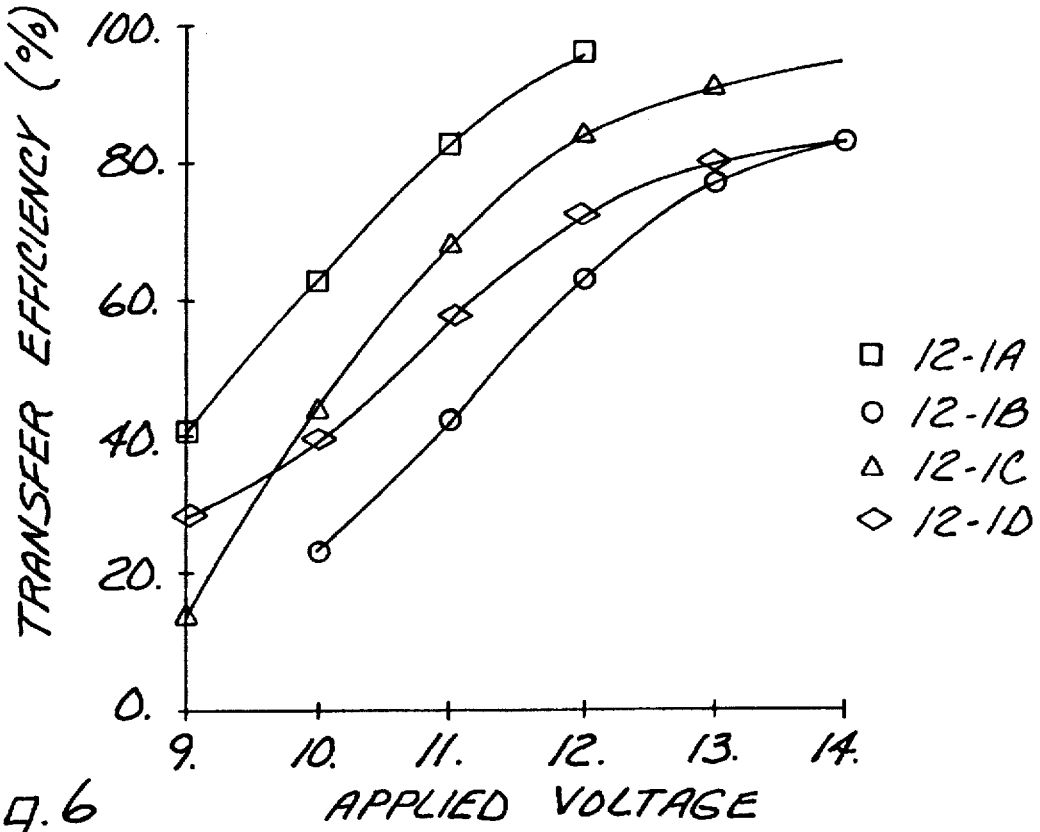
FIGS. 6, 7 and 8 are graphs of Transfer Efficiency versus Applied Voltage for various dye transfer compositions.
Figure 7:
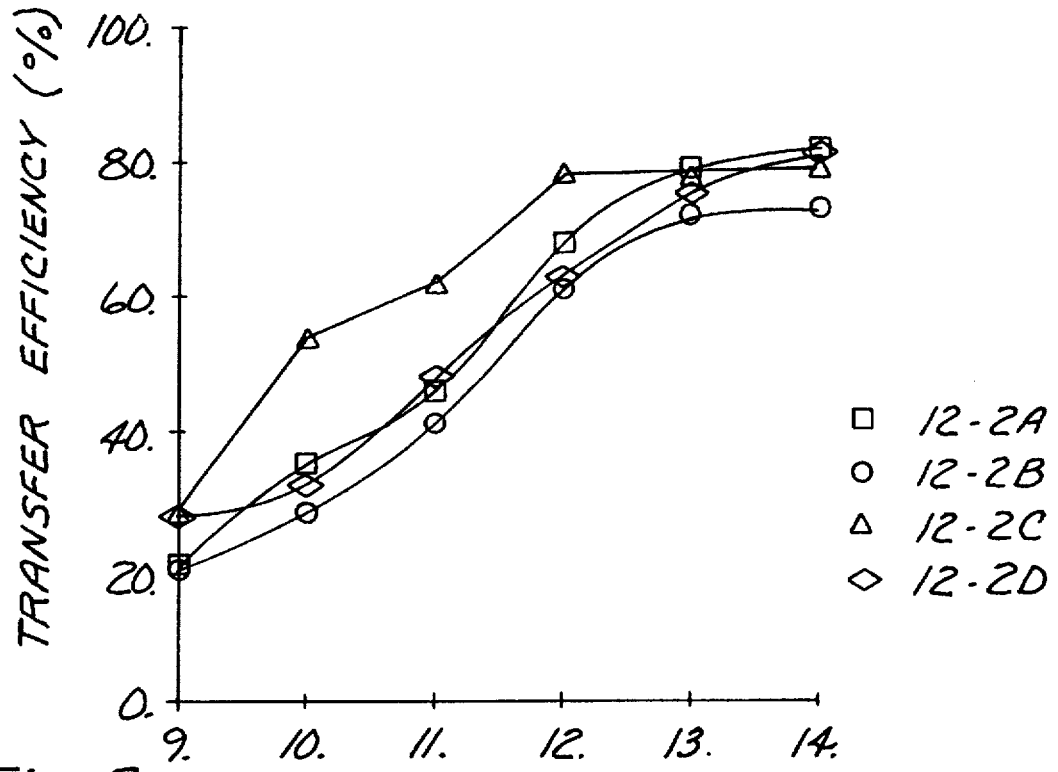

Dye transfer images onto receptor A of Example 9 were made using printer A of the same Example. The ITE indicator of thermal transfer efficiency was determined by the method of Example 11 as a function of voltage for a 4 msec pulse. The results are displayed graphically in FIG. 6 for images from donor sheets 12-1 and FIG. 7 for images from donor sheets 12-2. Eutectic compositions provide good transfer at all voltages without the undesirable light scattering observed for samples 12-1A and 12-2A.

EXAMPLE 13

This Example presents similar data to Example 12 but shows that the eutectic mixtures of this invention need not be used at the eutectic point composition to beneficially affect the image.

Donor sheets were prepared using 0.06 g of dye or dye mixture according to the formulation of donor sheet A in Example 9 except for drying in still, ambient air. The resultant components are listed below.

| Donor sheet no. | Dye or dye mixture | Molar ratio |
|---|---|---|
| 13A | 32 | no mixture |
| 13B | 3 and 32 | 0.332 |
| 13C | 3 and 32 | 0.587 - eutectic point |
| 13D | 3 and 32 | 2.042 |

Figure 8:
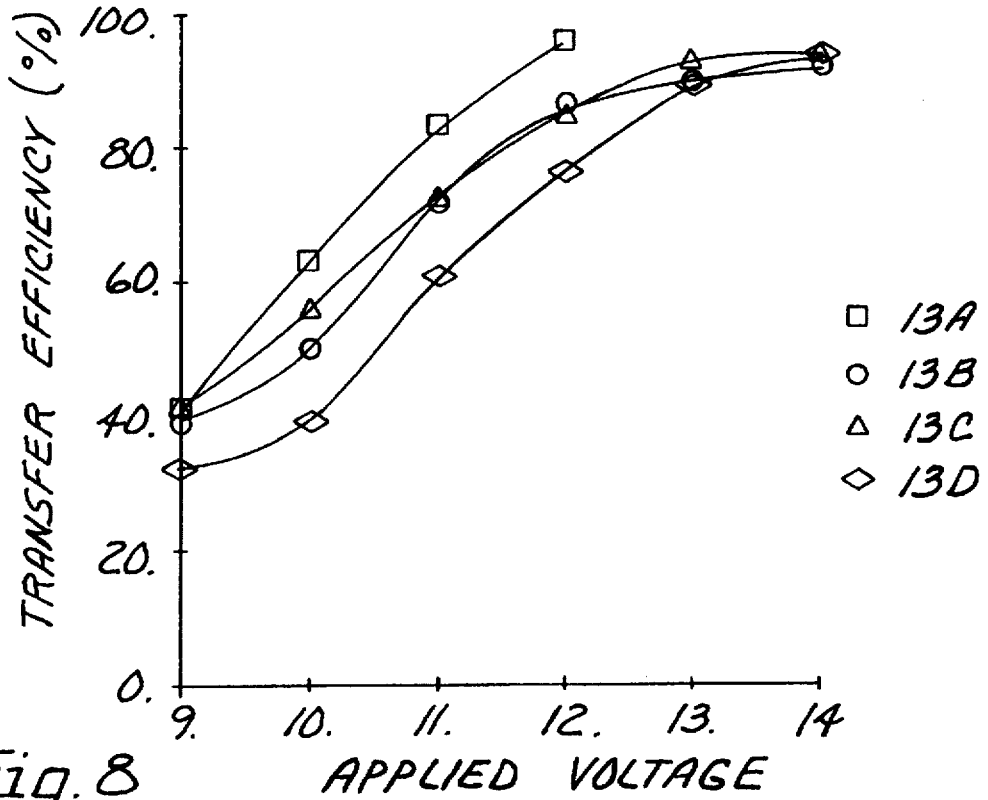

The ITE indicator of thermal transfer efficiency to receptor sheet A of Example 9 was determined as a function of thermal head voltage as in Example 12, and is displayed graphically in FIG. 8. The pure dye (13A) showed unacceptable light scattering. The results for the eutectic composition (13C) were good and almost identical to those for images from sample 13B, where the molar ratio was 0.56 times that at the eutectic point.

EXAMPLE 14

An undesirable effect sometimes observed in thermal dye transfer constructions of the dye sublimation kind is the transfer of polymeric binder from the donor sheet to the receptor, termed mass transfer. This can lead to excessive light scattering and a change in the perceived hue of the image. This Example shows the influence of eutectic mixtures on the occurrence of mass transfer.

Donor sheets were prepared using 0.06 g of dye or dye mixture in the formulation of donor sheet B of Example 9, with the composition given below.

| Donor sheet no. | Dye or dye mixture | Molar ratio |
|---|---|---|
| 14A | 3 | no mixture |
| 14B | 3 and 32 | 0.332 |
| 14C | 3 and 32 | 0.587 - eutectic point |
| 14D | 3 and 32 | 2.042 |
| 14E | 32 | no mixture |

Transferred dye images on receptor sheet A of Example 9 were formed using printer A of the same Example, operated with a 4 msec pulse in the voltage range 9 to 14 volts. The lowest voltage at which the onset of mass transfer occurred is tabulated below.

| Donor sheet no. | Mass transfer onset voltage |
|---|---|
| 14A | 9 or less |
| 14B | 9 or less |
| 14C | none |
| 14D | 12 |
| 14E | 12 |

The sample with the eutectic composition (14C) was the only one to show the absence of mass transfer at all the voltages tested.

EXAMPLE 15

For good image quality the imaging system should be capable of reproducing a broad range of input densities. The influence of eutectic dye mixtures on grey scale reproduction is presented here. The results indicate that the compositions of this invention can be used to improve grey scale capability.

The donor sheets 12-2 of Example 12 were used for imaging along with donor sheets 14 of Example 14. The sample compositions were as follows:

| Donor sheet no. | Dye or dye mixture | Molar ratio |
|---|---|---|
| 12-2A | 38 | no mixture |
| 12-2B | 3 and 38 | 0.255 |
| 12-2C | 3 and 38 | 1.275 - eutectic point |
| 12-2D | 3 and 38 | 3.965 |
| 14A | 32 | no mixture |
| 14B | 3 and 32 | 0.332 |
| 14C | 3 and 32 | 0.587 - eutectic point |
| 14D | 3 and 32 | 2.042 |
| 14E | 3 | no mixture |

These samples were imaged onto receptor sheet A of Example 9 with a 32 step grey scale obtained by pulse modulation using printer A of the same Example. The resultant number of resolvable steps in the thermally transferred images on the receptor sheet is listed below.

| Donor sheet no. | Number of steps |
|---|---|
| 12-2A | 24 |
| 12-2B | 24 |
| 12-2C | 26 |
| 12-2D | 23 |
| 14A | 24 |

-continued

| Donor sheet no. | Number of steps |
|---|---|
| 14B | 26 |
| 14C | 28 |
| 14D | 25 |
| 14E | 23 |

For both sets of mixtures, compositions at or near the eutectic point resulted in improved grey scale reproduction.

EXAMPLE 16

It has been observed that excessive crystallinity of dyes in the donor sheet can lead to handling problems. These can include reduced rub resistance, diminished shelf life, or partial transfer of the dye to the receptor merely under contact pressure, without any application of heat. This Example shows the effect of the eutectic mixtures of this invention on crystallinity in the donor sheet, as quantified by an index of light scattering.

Donor sheets were prepared using 0.06 g of dye or dye mixture in the formulation of donor sheet C of Example 9, with the compositions given below.

| Donor sheet no. | Dye or dye mixture | Molar ratio |
|---|---|---|
| 16A | 18 | no mixture |
| 16B | 18 and 35 | 0.112 |
| 16C | 18 and 35 | 0.424 - eutectic point |
| 16D | 18 and 35 | 3.003 |
| 16E | 35 | no mixture |

An index of light scattering, termed ILS, was determined as follows. A transmission optical density, TOD, was determined for the donor sheet sample with a densitometer. The sample was then positioned over an aperture in a box which formed an efficient light trap and an apparent scattering optical denisty, SOD, normal to the sample surface was measured using the same densitometer with the same filters for light incident at 45 degrees to the sample surface. ILS was computed as TOD-SOD, so that larger ILS values imply less scattering. The results are tabulated below.

| Donor sheet no. | ILS value |
|---|---|
| 16A | 1.45 |
| 16B | 1.50 |
| 16C | 2.64 |
| 16D | 1.84 |
| 16E | 1.69 |

The donor sheet containing a mixture at the eutectic point composition is the least scattering.

EXAMPLE 17

It is well known in the art (e.g. M. W. Rembold and H. E. A. Kramer, Org. Coat. Plast. Chem., 42, 703 (1980); J. Soc. Dyers Colour., 96, 122 (1980)) that mixtures of dyes frequently undergo photoinduced degradation faster than either component dye in isolation. This phenomenon is known as catalytic fading, and leads to objectionable changes in hue and density of the image. Surprisingly, it has been found that image constructions based on eutectic mixtures can enhance photostability of a dye relative to the same dye in isolation and so result in a more durable image. This effect is documented here.

Donor sheets were prepared using 0.06 g of dye or dye mixture in the formulation of donor sheet F of Example 9, with the compositions given below.

| Donor sheet no. | Dye or dye mixture | Molar ratio |
|---|---|---|
| 17A | 18 | no mixture |
| 17B | 18 and 36 | 1.66 |
| 17C | 36 | no mixture |
| 17D | 18 and 37 | 1.65 |
| 17E | 37 | no mixture |

These donor sheets were thermally imaged onto receptor C of Example 9, using printer B of the same Example. The photostability of the resultant images was assessed by 24 hour exposure on a 360 watt 3M Model 213 overhead projector and in an Atlas UVICON® at 350 nm and 50° C. Results for the overhead projector are presented below as percentage loss in image density, while the UVICON® results are expressed as DELTA E, the change in (L, a, b) color coordinates.

| Sample number | % density loss O/H projector | DELTA E UVICON ™ |
|---|---|---|
| 17A | 12 | 4.0 |
| 17B | 12 | 8.8 |
| 17C | 12 | 17.2 |
| 17D | 33 | 6.8 |
| 17E | 45 | 16.7 |

A stabilizing effect of the eutectic mixture with respect to one of the pure components is demonstrated for light exposure to either the UV or the visible, or both spectral regions, depending on mixture components.

EXAMPLE 18

This example illustrates that the beneficial photostability enhancement described in Example 17 can also be obtained using a eutectic mixture of a dye and a colorless substance. Donor sheets of dye 33 (0.0624 g) or with added compound 44 (0.015 g) were prepared using formulation E1 of Example 9. Donor sheets of dye 34 (0.09 g) or with added compound 44 (0.015 g) were prepared using formulation E2 of Example 9. Donor sheets of dye 26 (0.0627 g) or with added compound 44 (0.015 g) were prepared using formulation E1 of Example 9. The compositions of the samples are given below.

| Donor sheet no. | Dye or dye mixture | Molar ratio |
|---|---|---|
| 18-1A | 33 | no mixture |
| 18-1B | 44 and 33 | 0.60 |
| 18-2A | 34 | no mixture |
| 18-2B | 44 and 34 | 0.48 |
| 18-3A | 26 | no mixture |
| 18-3B | 44 and 26 | 0.50 |

These donor sheets were thermally imaged on to receptor sheet C of Example 9, using printer B of the same Example. The photostability was evaluated by the methods of Example 17, with the results below.

| Sample number | % density loss O/H projector | DELTA E UVICON ™ |
|---|---|---|
| 18-1A | 21 | 22.0 |
| 18-1B | 15 | 16.0 |
| 18-2A | 6 | 50.0 |
| 18-2B | 3 | 20.0 |
| 18-3A | 10 | 16.5 |
| 18-3B | 1 | 3.9 |

A stabilizing effect of the eutectic mixture is demonstrated for light exposure to both the UV and the visible spectral regions in all cases.

EXAMPLE 19

The eutectic mixtures of this invention can also beneficially influence the thermal stability of the image on the receptor, as illustrated with an accelerated aging test at 50° C.

Donor sheets of dyes 3 and 8 either alone or in a mixture were prepared by combining 0.06 g of the dye or dye mixture with the formulation of donor sheet A of Example 9. The samples had the compositions listed below and were imaged onto the receptor sheet A of Example 9 using Printer A in that Example.

| Donor sheet no. | Dye or dye mixture | Molar ratio |
|---|---|---|
| 19A | 3 | no mixture |
| 19B | 3 and 32 | 0.587 - eutectic point |
| 19C | 3 and 38 | 1.275 - eutectic point |
| 19D | 8 | no mixture |
| 19E | 8 and 32 | 0.619 - eutectic point |

These samples were held at 50° C. for 24 hours without exposure to light and DELTA E, the resultant change in (L, a, b) color coordinates was measured. The results are tabulated below.

| Donor sheet | DELTA E |
|---|---|
| 19A | 8.0 |
| 19B | 1.2 |
| 19C | 1.9 |
| 19D | 4.0 |
| 19E | 2.7 |

Color changes caused by thermally induced aging are diminished in the eutectic point compositions.

SOURCES OF MATERIALS

Unless otherwise noted, all the components of the eutectic mixtures explicitly discussed herein are known compounds, in the sense that they have been assigned a Chemical Abstracts Registry Number, or a Color Index number, or have been disclosed in patents.

Some materials are analogous to known classes of materials and can be prepared in the same way. For example, compounds 3, 14 and 17 can be prepared by the method of R. D. Desai and R. N. Desai, J. Indian Chem. Soc., 33, 559 (1956), while compounds 9 and 15 can be made by the method of P. Ruggli and E. Heinzi, Helv. Chim. Acta, 13, 409 (1930). Similarly, compounds 27, 28, 29, 33 and 34 can be prepared as described in European patent EP No. 218397.

Also compound 13 can be made by the procedure of U.S. Pat. No. 2,848,462; compound 24 by the method of U.S. Pat. No. 2,628,963; compound 30 as described in Federal Republic of Germany patent No. DE 3600349A; compound 31 according to Japanese patent No. JP 60-079353; compound 37 as discussed in Japanese patent No. JP 62-033669; and compound 39 as revealed in U.S. Pat. No. 3,933,914.

Some other materials are new, and previously unreported. Their syntheses are described below.

Preparation of Compound 6

Into a 100 ml round-bottom flask equipped with a condenser, stirrer and heating mantle were placed 3.32 g 1-aminoanthraquinone and 50 ml n-butyl acetate. 1.1 g of n-butyl isocyanate were added with stirring. A further 0.5 g of n-butyl isocyanate were added after 48 hours of reflux. After a total of 100 hours reaction time the solvent was removed at reduced pressure and the residue was chromatographed on silica gel using dichloromethane as the eluent. Compound 6 was isolated by recrystallization from toluene.

Preparation of Compound 8

Into a 100 ml round-bottom flask equipped with a magnetic stirrer, condenser and heating mantle were added 0.4 g of copper acetate, 0.4 g of potassium carbonate, 1.0 g of 1-chloranthraquinone, 1.0 g of n-octylsulfonamide and 15 ml of o-dichlorobenzene. The mixture was refluxed for 3.5 hours. The product was precipitated by addition of 100 ml of methanol and was filtered. The precipitate was recrystallized from methylene chloride by addition of methanol to give compound 8.

Preparation of Compound 20

5.00 g of 1-bromo-4-methylamino-anthraquinone, 1.49 g of sodium iso-butoxide, 1.30 g of sodium acetate, 3.16 g of cupric acetate monohydrate and 100 ml of iso-butanol were placed in a glass bottle, which was then sealed. The bottle was heated in an oil bath with magnetic stirring at 120° C. for 18 hours. The reaction mixture was cooled and filtered through diatomaceous earth, which was rinsed with ether. The combined filtrates were evaporated under reduced pressure and the residue was recrystallized from n-butanol to afford compound 20.

1

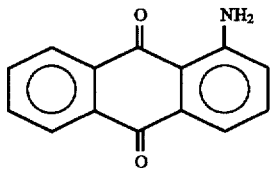

2

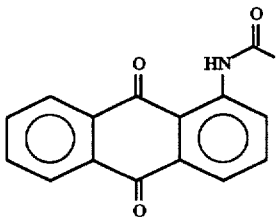

-continued

3

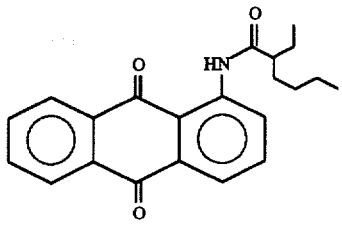

4

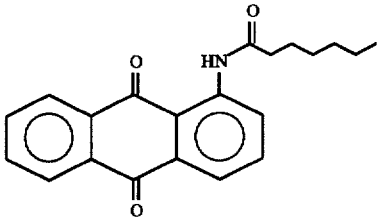

5

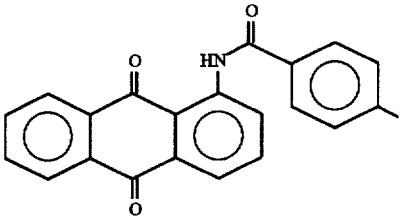

6

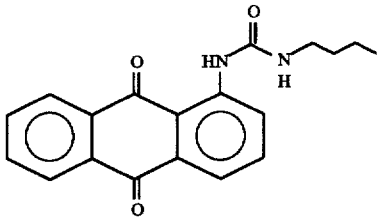

7

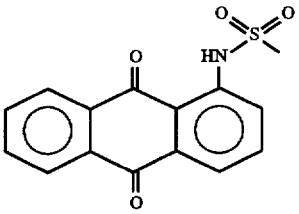

8

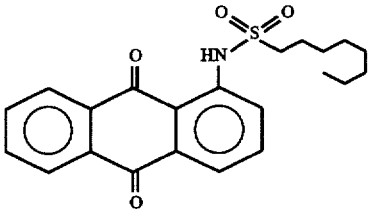

9

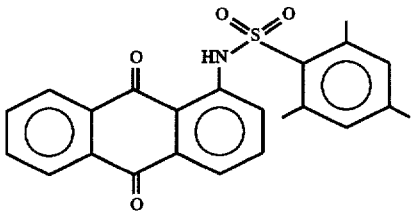

-continued
10
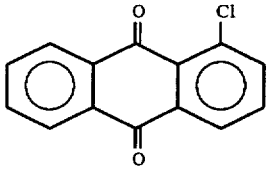
11
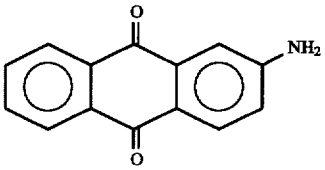
12
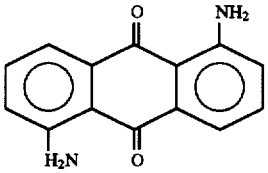
13
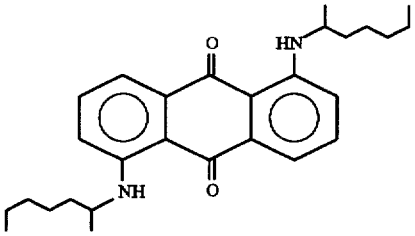
14
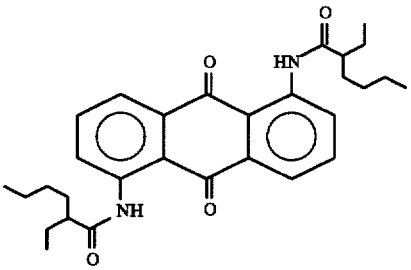
15
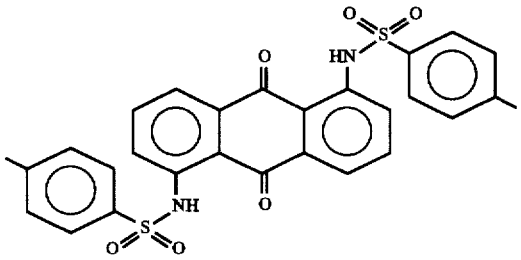
16
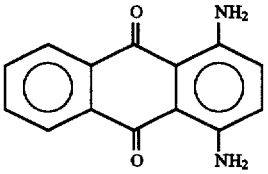
-continued
17
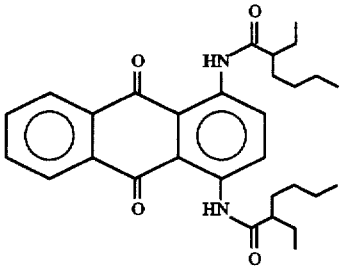
18
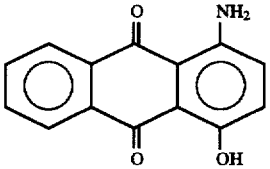
19
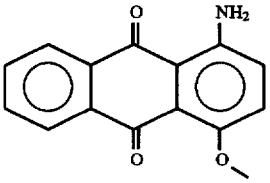
20
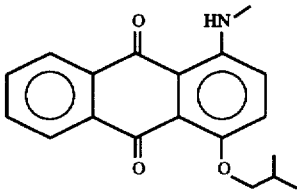
21
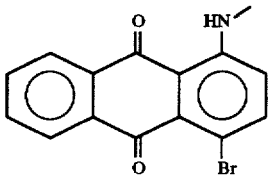
22
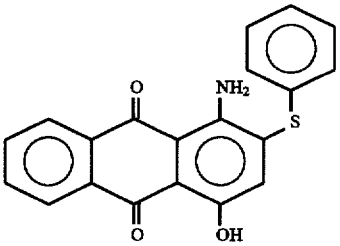
23
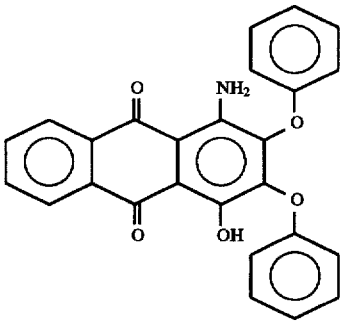

-continued
24
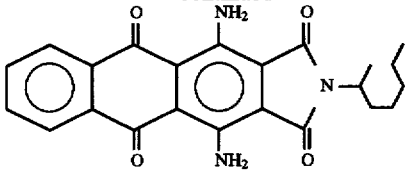
25
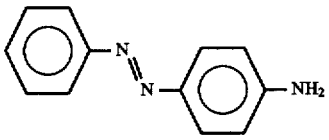
26
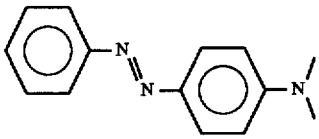
27
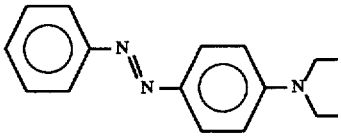
28
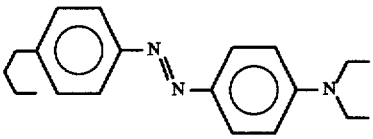
29
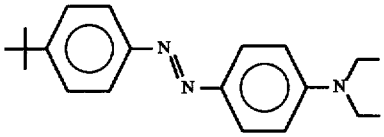
30
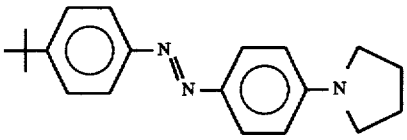
31
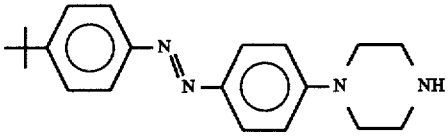
32
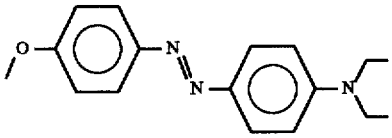
33
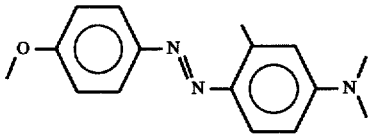
34
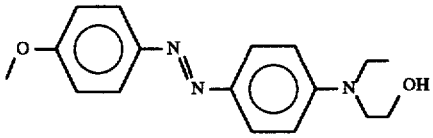
-continued
35
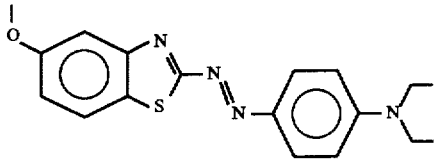
36
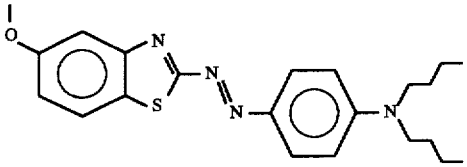
37
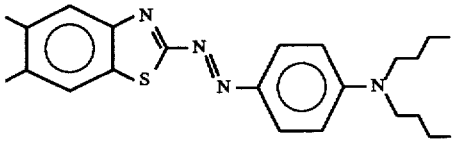
38
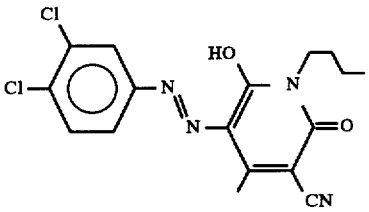
39
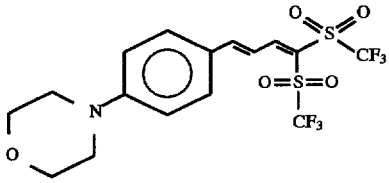
40
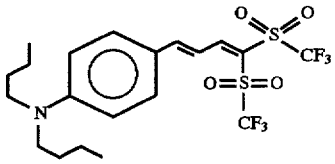
41
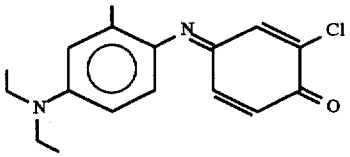
42
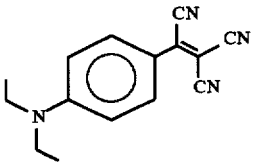
43
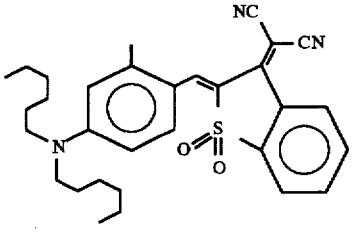

-continued

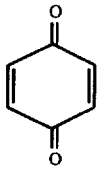

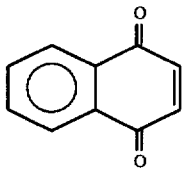

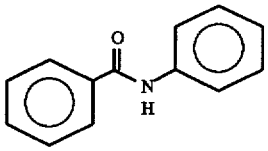

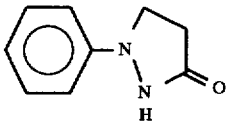

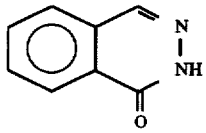

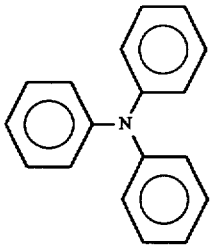

The term "thermal dye transfer" as used in the present text relates to any process by which dye (alone or in association with carrier materials such as solvents, binders, etc.) is transferred from one layer to another layer or sheet. Such processes are well known in the art and referred to in terms such as thermal dye transfer, sublimation transfer, mass transfer, direct transfer, strippable transfer, peel apart, and the like. Dye content may be as low as two percent or as high as 100 percent in such systems.

*Color Index Numbers and names of some of these dyes are as follows:*

| DYE NO. | C.I. NO. | NAME |
|---|---|---|
| 5 | Related to 60515 | Algol Yellow WG (Bayer) |
| 16 | 61100 | CI Disperse Violet 1 |
| 18 | 60710 | CI Disperse Red 15 |
| 23 | 62025 | CI Disperse Red 26 |
| 24 | | Related CI Disperse Blue 60 |
| 25 | 11000 | CI Solvent Yellow 1 |
| 26 | 11020 | CI Solvent Yellow 2 |
| 27 | 11021 | CI Solvent Yellow 56 |

-continued

| DYE NO. | C.I. NO. | NAME |
|---|---|---|
| 28–34 | | Same Yellow Chromophore as 25–27 |
| 35–37 | | Same Chromophore as CI Disperse Red 58 |
| 43 | | Foron Brilliant Blue |

We claim:

1. A thermal dye transfer element comprising a substrate having on one side thereof a layer of a polymeric binder having a mixture of at least two *yellow* dyes therein, said dyes being capable of forming a eutectic composition and at least one pair of said dyes being present within said binder in a ratio which is between 0.25 and 4.0 times the ratio of said pair of dyes in a eutectic point composition, said mixture of dyes comprising at least 20% by weight of said layer and said eutectic composition has a melting point which is at least 5° C. lower than the lowest melting temperature of any of said dyes in said eutectic composition.

2. The element of claim 1 wherein at least one of said dyes is an azo dye.

3. The element of claim 2 wherein at least one of said dyes is an anthraquinone dye.

4. The element of claim 2 wherein said eutectic composition has a melting point which is at least 5° C. lower than the lowest melting temperature of any of said dyes in said eutectic composition.

5. The element of claim 4 wherein at least some portion of each dye which forms said eutectic composition is present within said binder layer as a solid particulate.

6. The element of claim 1 wherein at least one of said dyes is an anthraquinone dye.

7. A thermal dye transfer composition as in claim 1 wherein said pair of dyes has a molar ratio in the range 0.05 to 20.0 at the eutectic point composition.

8. A thermal dye transfer composition as in claim 1 wherein at least one of said dyes is selected from the group consisting of azo dyes, anthraquinone dyes, aminostyryl, azomethine, and disulphone classes, and combinations thereof.

9. The element of claim 1 wherein said mixture of at least two dyes consists of two dyes.

10. A thermal dye transfer element comprising a substrate having on one side thereof a layer of a polymeric binder having a mixture of at least two *yellow* dyes therein, said dyes being capable of forming a eutectic composition and at least one pair of said dyes being present within said binder in a ratio which is between 0.25 and 4.0 times the ratio of said pair of dyes in a eutectic point composition, said mixture of dyes comprising at least [20%] *20 to 90%* by weight of said layer, and said eutectic composition has a melting point which is at least 5° C. lower than the lowest melting temperature of any of said dyes in said eutectic composition.

11. A thermal dye transfer element comprising a substrate having on one side thereof a layer of at least two *yellow* dyes therein, said dyes being capable of forming a eutectic composition and at least one pair of said dyes being present [within said binder] in a ratio which is between 0.25 and 4.0 times the ratio of said pair of dyes in a eutectic point composition, and said eutectic composition has a melting point which is at least 5° C. lower than the lowest melting temperature of any of said dyes in said eutectic composition.

12. A thermal dye transfer element comprising a single, self-sustaining layer of a polymeric binder having a mixture of at least two *yellow* dyes therein, said dyes being capable of forming a eutectic composition and at least one pair of said dyes being present within said binder in a ratio which is between 0.25 and 4.0 times the ratio of said pair of dyes in a eutectic point composition, said mixture of dyes comprising at least [20%] *20 to 90%* by weight of said layer, and said eutectic composition has a melting point which is at least 5° C. lower than the lowest melting temperature of any of said dyes in said eutectic composition.

13. The element of claim 12 wherein at least one said dyes is an azo dye.

14. The element of claim 13 wherein at least one of said dyes is an anthraquinone dye.

15. The element of claim 14 wherein said eutectic composition has a melting point which is at least 5° C. lower than the lowest melting temperature of any of said dyes in said eutectic composition.

16. The element of claim 15 wherein at least some portion of each dye which forms said eutectic composition is present within said binder layer as a solid particulate.

17. The element of claim 13 wherein said eutectic composition has a melting point which is at least 5° C. lower than the lowest melting temperature of any of said dyes in said eutectic composition.

18. The element of claim 17 wherein at least some portion of each dye which forms said eutectic composition is present within said binder layer as a solid particulate.

19. The element of claim 12 wherein at least one of the said dyes is an anthraquinone dye.

20. The element of claim 19 wherein said eutectic composition has a melting point which is at least 5° C. lower than the lowest melting temperature of any of said dyes in said eutectic composition.

21. The element of claim 20 wherein at least some portion of each dye which forms said eutectic composition is present within said binder layer as a solid particulate.

22. The element of claim 12 wherein at least some portion of each dye which forms said eutectic composition is present within said binder layer as a solid particulate.

*23. A thermal dye transfer element comprising a substrate having on one side thereof a layer of a polymeric binder having a mixture of at least two magenta dyes therein, said dyes being capable of forming a eutectic composition and at least one pair of said dyes being present within said binder in a ratio which is between 0.25 and 4.0 times the ratio of said pair of dyes in a eutectic point composition, said mixture of dyes comprising at least 20 to 90% by weight of said layer and said eutectic composition having a melting point which is at least 5° C. lower than the lowest melting temperature of any of said dyes in said eutectic composition, wherein at least one of said at least two magenta dyes is a dye selected from the group consisting of a monoazo dye, aminostyryl dye, an azomethine dye, and a disulfone dye.*

*24. The element of claim 23 wherein said eutectic composition has a melting point which is at least 10° C. lower than the lowest melting temperature of any of said dyes in said eutectic composition.*

*25. The element of claim 23 wherein at least some portion of each dye which forms said eutectic composition is present within said binder layer as a solid particulate.*

*26. A thermal dye transfer composition as in claim 1 wherein at least one of said pair of dyes has a molar ratio at the eutectic point composition.*

*27. The element of claim 23 wherein in addition to said at least one dye, an azo dye is in said eutectic composition.*

*28. The element of claim 23 wherein in addition to said at least one dye, an anthraquinone dye is in said eutectic composition.*

*29. The element of claim 23 wherein in addition to said at least one dye, another dye selected from the group consisting of azo dyes, anthraquinone dyes, aminostyryl dyes, azomethine dyes, and disulfone dyes is present in said eutectic composition.*

*30. A thermal dye transfer element comprising a substrate having on one side thereof a layer of a polymeric binder having a mixture of at least two cyan dyes therein, said dyes being capable of forming a eutectic composition and at least one pair of said dyes being present within said binder in a ratio which is between 0.25 an 4.0 times the ratio of said pair of dyes in a eutectic point composition, said mixture of dyes comprising at least 20 to 90% by weight of said layer, and said eutectic composition having a melting point which is at least 5° C. lower than the lowest melting temperature of any of said dyes in said eutectic composition, at least one of said at least two cyan dyes being selected from the group consisting of an azo dye and an azomethine dye.*

*31. A thermal dye transfer element as in claim 30 wherein a second dye present is an anthraquinone dye.*

* * * * *